US012750458B2

(12) United States Patent
Bao et al.

(10) Patent No.: US 12,750,458 B2
(45) Date of Patent: Sep. 29, 2026

(54) DISPLAY DEVICE

(71) Applicants: K-TRONICS (SUZHOU) TECHNOLOGY CO., LTD., Suzhou (CN); BOE TECHNOLOGY GROUP CO., LTD., Beijing (CN)

(72) Inventors: Hanfei Bao, Beijing (CN); Min Chen, Beijing (CN); Liushuai Zhao, Beijing (CN); Wenbo Dong, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 55 days.

(21) Appl. No.: 18/717,516

(22) PCT Filed: Dec. 6, 2022

(86) PCT No.: PCT/CN2022/136833

§ 371 (c)(1),
(2) Date: Jun. 7, 2024

(87) PCT Pub. No.: WO2023/104014

PCT Pub. Date: Jun. 15, 2023

(65) Prior Publication Data

US 2025/0047804 A1 Feb. 6, 2025

(30) Foreign Application Priority Data

Dec. 9, 2021 (CN) ......................... 202111499678.5
Jun. 9, 2022 (CN) ......................... 202210649030.X

(51) Int. Cl.
*H04N 5/64* (2006.01)
*H04N 7/22* (2006.01)

(52) U.S. Cl.
CPC ................. *H04N 5/64* (2013.01); *H04N 7/22* (2013.01)

(58) Field of Classification Search
CPC ........... H04N 21/436; H04N 5/64; H04N 7/22
See application file for complete search history.

(56) References Cited

U.S. PATENT DOCUMENTS

2018/0288875 A1* 10/2018 Sasaki .................... H05K 1/118
2018/0332371 A1* 11/2018 Suzuki ............... H04Q 11/0005
2018/0373094 A1* 12/2018 Ryoo ................ G02F 1/133603

FOREIGN PATENT DOCUMENTS

CN 105915828 A 8/2016
CN 110876041 A 3/2020
(Continued)

OTHER PUBLICATIONS

International Search Report of PCT application No. PCT/CN2022/136833 dated Feb. 13, 2023.
(Continued)

*Primary Examiner* — Randy A Flynn
(74) *Attorney, Agent, or Firm* — Calfee, Halter & Griswold LLP

(57) ABSTRACT

The display device includes a signal source end, a display end and a transmission portion. The signal source end and the display end are separately arranged and are connected to each other through the transmission portion. The signal source end includes a first control circuit for outputting a VBY ONE data signal, and a first signal transmission module connected to the first control circuit and configured for acquiring a VBY ONE data signal and converting the VBY ONE data signal into an optical signal. The transmission portion at least includes an optical fiber. The display end includes a second signal transmission module connected to the first signal transmission module through the optical fiber, and configured for converting a optical signal into a VBY
(Continued)

ONE data signal; and a display module connected to the second signal transmission module and configured for acquiring a VBY ONE data signal to perform image display.

16 Claims, 16 Drawing Sheets

(56) References Cited

FOREIGN PATENT DOCUMENTS

| | | | |
|---|---|---|---|
| CN | 210839865 | U | 6/2020 |
| CN | 111479147 | A | 7/2020 |
| CN | 213072885 | U | 4/2021 |
| JP | 2002218275 | A | 8/2002 |

OTHER PUBLICATIONS

Written Opinion of PCT application No. PCT/CN2022/136833 dated Feb. 13, 2023.

* cited by examiner

DISPLAY DEVICE

CROSS-REFERENCE TO RELATED APPLICATIONS

The present application is a U.S. National Stage of International Application No. PCT/CN2022/136833, filed on Dec. 6, 2022, which claims the benefit of priority to Chinese patent applications with application No. 202111499678.5 filed on Dec. 9, 2021 and entitled "A display device" and with application No. 202210649030.X filed on Jun. 9, 2022 and entitled "A display device", the entire contents of which are incorporated herein by reference in their entireties.

TECHNICAL FIELD

The present disclosure relates to the field of television technology, and in particular to a display device.

BACKGROUND

In the related art, the TV adopts a mainboard and LCD module integrated structure, which has the disadvantages of high maintenance and upgrade costs and thick thickness of the TV.

It should be noted that the information disclosed in the above background technology section is only used to enhance the understanding of the background of the present disclosure, and therefore may include information that does not constitute prior art known to the skilled in the art.

SUMMARY

According to an aspect of the present disclosure, there is provided a display device, comprising a signal source end, a display end and a transmission part, where the signal source end is separately arranged from the display end and the signal source end and the display end are connected through the transmission part; where the signal source end includes: a first control circuit for outputting a V BY ONE data signal; and a first signal transmission module connected to the first control circuit, where the first signal transmission module is configured to obtain the V BY ONE data signal and convert the V BY ONE data signal into an optical signal for transmission; where the transmission part at least includes an optical fiber; and wherein the display end includes: a second signal transmission module connected to the first signal transmission module through the optical fiber, where the second signal transmission module is configured to convert the received optical signal into a corresponding V BY ONE data signal; and a display module connected to the second signal transmission module, where the display module is configured to obtain the V BY ONE data signal for image display.

In an embodiment of the present disclosure, the display device is a split TV.

In an embodiment of the present disclosure, the signal source end is arranged in an external speaker.

In an embodiment of the present disclosure, the signal source end further includes: a first power source module; the transmission part further comprises a power line; the first power source module is configured to supply power to the display module through the power line.

In an embodiment of the present disclosure, the first signal transmission module is connected between the first power source module and the power line to establish the connection between the first power source module and the power line.

In an embodiment of the present disclosure, the display module includes a backlight unit; the first power source module includes a first voltage output terminal; the power line includes a first power line; the first power source module is configured to output a first power supply signal through the first voltage output terminal, and transmit the first power supply signal through the first power line to supply power to the backlight unit.

In an embodiment of the present disclosure, the display module further includes: a display unit; a step-down unit connected between a power output terminal of the backlight unit and a power input terminal of the display unit, where the step-down unit is configured to output a fifth power supply signal according to an output voltage of the backlight unit to supply power to the display unit.

In an embodiment of the present disclosure, the display module further includes: a display unit; a step-down unit connected between a power input terminal of the display unit and the second signal transmission module, where the step-down unit is configured to receive the first power supply signal and output a fifth power supply signal according to the first power supply signal to power the display unit.

In an embodiment of the present disclosure, the display module further includes a display unit, and the first power source module is connected to the first control circuit; the first control circuit includes a third voltage output terminal; the power line further comprises a third power line; the first power source module is configured to output a third power supply signal through the third voltage output terminal, and transmit the third power supply signal through the third power line, and the third power supply signal is configured to power the display unit, wherein a voltage value of the third power supply signal is less than a voltage value of the first power supply signal; and/or, the first control circuit includes a fourth voltage output terminal; the power line further comprises a fourth power line; the first power source module is configured to output a fourth power supply signal through the fourth voltage output terminal, and transmit the fourth power supply signal through the fourth power line, and the fourth power supply signal is configured to power the second signal transmission module, wherein a voltage value of the fourth power supply signal is less than a voltage value of the first power supply signal.

In an embodiment of the present disclosure, the first control circuit further includes a detection level input terminal, and the first control circuit is configured to receive a detection level signal through the detection level input terminal; the display module further includes a detection level output terminal, and the display module is configured to output the detection level signal through the detection level output terminal; the power line further includes a second power line, and the second power line is configured to transmit the detection level signal; where, the detection level signal is configured to control an output of the first voltage output terminal, and/or, to control an output of the third voltage output terminal, and/or an output of the fourth voltage output terminal.

In an embodiment of the present disclosure, the signal source end further includes a first connector, the display end further includes a second connector, and the transmission part includes a third connector and a fourth connector, the third connector is configured to connect the first connector, and the fourth connector is configured to connect the second connector.

In an embodiment of the present disclosure, the first connector includes a first pin and a second pin; the second connector includes a twenty-first pin and a twenty-second pin; the third connector includes a thirty-first pin and a thirty-second pin, and the fourth connector includes a forty-first pin and a forty-second pin, the thirty-first pin is configured to connect the first pin, the thirty-second pin is configured to connect the second pin, the forty-first pin is configured to connect the twenty-first pin, and the forty-second pin is configured to connect the twenty-second pin; where, the first pin, the twenty-first pin, the thirty-first pin, and the forty-first pin are configured to transmit the first power supply signal, and the second pin, the twenty-second pin, the thirty-second pin, and the forty-second pin are configured to transmit the detection level signal; a pin length of the first pin is greater than a pin length of the second pin or a pin length of the thirty-first pin is greater than a pin length of the thirty-second pin, and a pin length of the twenty-first pin is greater than a pin length of the twenty-second pin or a pin length of the forty-first pin is greater than a pin length of the forty-second pin.

In an embodiment of the present disclosure, the first connector further includes a third pin and a fourth pin; the second connector further includes a twenty-third pin and a twenty-fourth pin; the third connector further includes a thirty-third pin and a thirty-fourth pin, the thirty-third pin is configured to connect the third pin, and the thirty-fourth pin is configured to connect the fourth pin; the fourth connector further includes a forty-third pin and a forty-fourth pin, the forty-third pin is configured to connect the twenty-third pin, and the forty-fourth pin is configured to connect the twenty-fourth pin; where, the third pin, the twenty-third pin, the thirty-third pin, and the forty-third pin are configured to transmit the third power supply signal, and the fourth pin, the twenty-fourth pin, the thirty-fourth pin, and the forty-fourth pin are configured to transmit the fourth power supply signal; a pin length of the third pin is the same as a pin length of the fourth pin, and pin lengths of the first pin, the third pin, and the second pin decrease in sequence, or a pin length of the thirty-third pin is the same as a pin length of the thirty-fourth pin, and pin lengths of the thirty-first pin, the thirty-third pin, and the thirty-second pin decrease in sequence; and a pin length of the twenty-third pin is the same as a pin length of the twenty-fourth pin, and pin lengths of the twenty-first pin, the twenty-third pin, and the twenty-second pin decrease in sequence, or a pin length of the forty-third pin is the same as a pin length of the forty-fourth pin, and pin lengths of the forty-first pin, the forty-third pin, and the forty-second pin decrease in sequence.

In an embodiment of the present disclosure, the V BY ONE data signal includes a first sub-data signal; the display module further includes a second control circuit, the second control circuit is configured to output a first display control signal through the second signal transmission module, and the first control circuit is configured to obtain the first display control signal through the first signal transmission module; the first connector further includes a fifth pin and a sixth pin; the second connector further includes a twenty-fifth pin and a twenty-sixth pin; the third connector further includes a thirty-fifth pin and a thirty-sixth pin, the thirty-fifth pin is configured to connect the fifth pin, and the thirty-sixth pin is configured to connect the sixth pin; the fourth connector further includes a forty-fifth pin and a forty-sixth pin, the forty-fifth pin is configured to connect the twenty-fifth pin, and the forty-sixth pin is configured to connect the twenty-sixth pin; where, the fifth pin, the twenty-fifth pin, the thirty-fifth pin, and the forty-fifth pin are configured to transmit the first sub-data signal; the sixth pin, the twenty-sixth pin, the thirty-sixth pin, and the forty-sixth pin are configured to transmit the first display control signal, and the first display control signal is configured to instruct the first control circuit to output the first sub-data signal.

In an embodiment of the present disclosure, the second control circuit is connected to the display unit; the first control circuit is further configured to output a first communication signal to communicate with the second control circuit to adjust a first display parameter of the display unit; the first connector further includes an eighth pin; the second connector further includes a twenty-eighth pin; the third connector further includes a thirty-eighth pin, the thirty-eighth pin is configured to connect the eighth pin; the fourth connector further includes a forty-eighth pin, the forty-eighth pin is configured to connect the twenty-eighth pin; the eighth pin, the twenty-eighth pin, the thirty-eighth pin, the forty-eighth pin is configured to transmit the first communication signal.

In an embodiment of the present disclosure, the display module further includes a second control circuit; the first control circuit is configured to output a second display control signal through the first signal transmission module, and the second control circuit is configured to obtain the second display control signal through the second signal transmission module; the first connector further includes an eighth pin; the second connector further includes a twenty-eighth pin; the third connector further includes a thirty-eighth pin, and the thirty-eighth pin is configured to connect the eighth pin; the fourth connector further includes a forty-eighth pin, and the forty-eighth pin is configured to connect the twenty-eighth pin; the eighth pin, the twenty-eighth pin, the thirty-eighth pin, and the forty-eighth pin are configured to transmit the second display control signal, and the second display control signal is configured for the first control circuit to communicate with the second control circuit and/or the backlight unit to adjust a preset parameter in the second control circuit and/or the backlight unit.

In an embodiment of the present disclosure, the V BY ONE data signal further includes a second sub-data signal; the first connector further includes a seventh pin; the second connector further includes a twenty-seventh pin; the third connector further includes a thirty-seventh pin, and the thirty-seventh pin is configured to connect the seventh pin; the fourth connector further includes a forty-seventh pin, and the forty-seventh pin is configured to connect the twenty-seventh pin; where, the seventh pin, the twenty-seventh pin, the thirty-seventh pin, and the forty-seventh pin are configured to transmit the second sub-data signal.

In an embodiment of the present disclosure, the display module further includes a second control circuit; the second control circuit is configured to output a first display control signal, the first display control signal is configured to instruct the first control circuit to output the V BY ONE data signal; the second signal transmission module is further configured to obtain the first display control signal and convert the first display control signal into an optical signal for transmission; the first signal transmission module is further configured to receive an optical signal corresponding to the first display control signal and convert the optical signal corresponding to the first display control signal into an electrical signal for output; and/or, the first control circuit is further configured to output a second display control signal, the second display control signal is configured for the first control circuit to communicate with the second control circuit and/or the backlight unit to adjust a preset parameter in the second control circuit and/or the backlight unit; the first signal transmission module is further configured to obtain the second display control signal and convert the second display control signal into an optical signal for transmission; the second signal transmission module is further configured to receive an optical signal corresponding to the second display control signal and convert the optical signal corresponding to the second display control signal into an electrical signal for output.

In an embodiment of the present disclosure, the V BY ONE data signal includes a first sub-data signal; the first signal transmission module includes: a first photoelectric unit, configured to convert the first sub-data signal into an optical signal for transmission; a second photoelectric unit, including a first channel, where the second photoelectric unit is configured to receive an optical signal corresponding to the first display control signal through the first channel, and convert corresponding optical signal into the first display control signal; the second signal transmission module includes: a fourth photoelectric unit, configured to convert an optical signal corresponding to the first sub-data signal into the first sub-data signal; a fifth photoelectric unit, including a first channel, where the fifth photoelectric unit is configured to convert the first display control signal into an optical signal for transmission through the first channel; the transmission part includes: a first sub-optical fiber, configured to transmit the optical signal corresponding to the first sub-data signal; a second sub-optical fiber, configured to transmit the first display control signal; where, a power of the first photoelectric unit is greater than a power of the second photoelectric unit, and a power of the fourth photoelectric unit is greater than a power of the fifth photoelectric unit.

In an embodiment of the present disclosure, the second photoelectric unit further includes a second channel, and the second photoelectric unit is further configured to convert the second display control signal into an optical signal for transmission through the second channel; the fifth photoelectric unit further includes a second channel, and the fifth photoelectric unit is configured to convert the optical signal corresponding to the second display control signal into the second display control signal for output through the second channel; the transmission part further includes: a fourth sub-optical fiber for transmitting the optical signal corresponding to the second display control signal.

In an embodiment of the present disclosure, the V BY ONE data signal further includes a second sub-data signal; the first signal transmission module further includes: a third photoelectric unit configured to convert the second sub-data signal into an optical signal for transmission; the second signal transmission module further includes: a sixth photoelectric unit configured to convert the optical signal corresponding to the second sub-data signal into the second sub-data signal; the transmission part further includes: a third sub-optical fiber for transmitting the optical signal corresponding to the second sub-data signal; where, a power of the third photoelectric unit is greater than a power of the second photoelectric unit, and a power of the sixth photoelectric unit is greater than a power of the fifth photoelectric unit.

In an embodiment of the present disclosure, the V BY ONE data signal includes a first sub-data signal; the first signal transmission module includes: a first terminal at least configured to transmit the first display control signal and the first sub-data signal; and a second terminal at least configured to transmit the second display control signal.

In an embodiment of the present disclosure, the V BY ONE data signal further includes a second sub-data signal; the first signal transmission module further includes: a third terminal configured to transmit the second display control signal and the second sub-data signal; where, the second terminal and the third terminal are configured to receive the same second display control signal.

In an embodiment of the present disclosure, the first display control signal includes at least one of the following or includes all of the following: a hot plug detection signal, output to the first control circuit, configured to feedback a connection status between the first control circuit and the second control circuit; a clock lock signal, output to the first control circuit, configured to feedback whether the second control circuit decodes a clock signal output by the first control circuit.

In an embodiment of the present disclosure, the second display control signal includes at least one of the following or includes all of the following: a second communication signal, configured for the first control circuit to communicate with the second control circuit to adjust a display parameter of the second control circuit; a backlight control signal, output to the backlight driving board, configured to control the backlight source in the display module to turn on or off; a backlight adjustment signal, output to the backlight driving board, configured to adjust brightness of the backlight source in the display module; and an asynchronous communication signal, configured for the first control circuit to communicate with the display end.

In an embodiment of the present disclosure, the signal source end further includes: a switch control circuit, where the switch control circuit controls an output of the first voltage output terminal, and/or controls an output of the third voltage output terminal, and/or controls an output of the fourth voltage output terminal in response to a signal of the first control circuit.

In an embodiment of the present disclosure, the switch control circuit and the first signal transmission module are located on a same circuit board.

In an embodiment of the present disclosure, the switch control circuit includes: a first switch module, including a first switch unit, a second switch unit and a third switch unit, where a control terminal of the first switch unit is connected to the detection level signal, a first terminal of the first switch unit is connected to the first power supply signal through a voltage divider circuit, and a second terminal of the first switch unit is grounded; a control terminal of the second switch unit is connected to the first terminal of the first switch unit, a first terminal of the second switch unit is connected to the first power supply signal through another voltage divider circuit, and a second terminal of the second switch unit is grounded; a control terminal of the third switch unit is connected to the first terminal of the second switch unit, a first terminal of the third switch unit is connected to the first power supply signal, and the second terminal of the third switch unit is connected to a first voltage output terminal; a first power control terminal connected to the first terminal of the second switch unit; the first control circuit is configured to control an output of the first voltage output terminal based on the detection level signal, or to control an output of the first voltage output terminal by outputting a first power supply control signal through the first power control terminal.

In an embodiment of the present disclosure, the switch control circuit further includes: a second switch module, including a fourth switch unit, a fifth switch unit and a sixth switch unit, where a control terminal of the fourth switch unit is connected to the detection level signal, a first terminal of the fourth switch unit receives a third power supply signal through a voltage divider circuit, and a second terminal of the fourth switch unit is grounded; a control terminal of the fifth switch unit is connected to the first terminal of the fourth switch unit, a first terminal of the fifth switch unit is connected to the third power supply signal through another voltage divider circuit, and a second terminal of the fifth switch unit is grounded; a control terminal of the sixth switch unit is connected to the first terminal of the fifth switch unit, a first terminal of the sixth switch unit is connected to the third power supply signal, and a second terminal of the sixth switch unit is connected to a third voltage output terminal; the third power supply signal is configured to power the display unit; and a second power control terminal connected to the first terminal of the fifth switch unit; where the first control circuit is configured to control an output of the third voltage output terminal based on the detection level signal, or to control an output of the third voltage output terminal by outputting a second power supply control signal through the second power control terminal.

In an embodiment of the present disclosure, the switch control circuit further includes: a third switch module, including a seventh switch unit, an eighth switch unit and a ninth switch unit, where a control terminal of the seventh switch unit is connected to the detection level signal, a first terminal of the seventh switch unit receives a fourth power supply signal through a voltage divider circuit, and a second terminal of the seventh switch unit is grounded; a control terminal of the eighth switch unit is connected to the first terminal of the seventh switch unit, a first terminal of the eighth switch unit receives the fourth power supply signal through another voltage divider circuit, and a second terminal of the eighth switch unit is grounded; a control terminal of the ninth switch unit is connected to the first terminal of the eighth switch unit, a first terminal of the ninth switch unit receives the fourth power supply signal, and a second terminal of the ninth switch unit is connected to a fourth voltage output terminal; the fourth power supply signal is configured to power the second signal transmission module; a third power control terminal connected to the first terminal of the eighth switch unit; where the first control circuit is configured to control an output of the fourth voltage output terminal based on the detection level signal, or to control an output of the fourth voltage output terminal by outputting a third power supply control signal through the third power control terminal.

In an embodiment of the present disclosure, the first switch unit and the second switch unit are both transistors, and the third switch unit is a MOS transistor; and/or, the fourth switch unit and the fifth switch unit are both transistors, and the sixth switch unit is a MOS transistor; and/or, the seventh switch unit and the eighth switch unit are both transistors, and the ninth switch unit is a MOS transistor.

According to a second aspect of the present disclosure, there is provided a signal source end, and the signal source end includes: a first control circuit for outputting a V BY ONE data signal; a first signal transmission module connected to the first control circuit, and the first signal transmission module is configured to obtain the V BY ONE data signal and convert the V BY ONE data signal into an optical signal for transmission.

In an embodiment of the present disclosure, the signal source end further includes: a first power source module, including a first voltage output terminal, the first voltage output terminal is connected to the first signal transmission module, and the first power source module is configured to output a first power supply signal through the first voltage output terminal, and the first power supply signal is configured to power the display module of the display end.

In an embodiment of the present disclosure, the first control circuit includes a third voltage output terminal and/or a fourth voltage output terminal; the first control circuit is configured to output a third power supply signal through the third voltage output terminal, and/or output a fourth power supply signal through the fourth voltage output terminal, where the third power supply signal is configured to power the display unit in the display module of the display end, and the fourth power supply signal is configured to power the first signal transmission module and the second signal transmission module of the display end, and the voltage value of the third power supply signal and the voltage value of the fourth voltage power supply signal are both less than the voltage value of the first power supply signal.

In an embodiment of the present disclosure, the first control circuit includes a detection level input terminal, and the first control circuit is further configured to receive a detection level signal through the detection level input terminal, and the detection level signal is configured to instruct the first control circuit to perform output control on the first voltage output terminal and/or to instruct the first control circuit to perform output control on the third voltage output terminal and/or to instruct the first control circuit to perform output control on the fourth voltage output terminal.

In an embodiment of the present disclosure, the signal source end further includes a first connector, the first connector includes: a first pin for transmitting a first power supply signal; a second pin for transmitting a detection level signal; a pin length of the first pin is greater than a pin length of the second pin; the signal source end further includes: a first switch module, including a first switch unit, a second switch unit and a third switch unit, a control terminal of the first switch unit is connected to the detection level signal, a first terminal of the first switch unit is connected to the first power supply signal through a voltage divider circuit, and a second terminal of the first switch unit is grounded; a control terminal of the second switch unit is connected to the first terminal of the first switch unit, a first terminal of the second switch unit is connected to the first power supply signal through another voltage divider circuit, and a second terminal of the second switch unit is grounded; a control terminal of the third switch unit is connected to the first terminal of the second switch unit, a first terminal of the third switch unit is connected to the first power supply signal, and a second terminal of the third switch unit is connected to the first voltage output terminal; the first control circuit is configured to control the output of the first voltage output terminal based on the detection level signal.

In an embodiment of the present disclosure, the first control circuit further includes: a first power control terminal connected to the first terminal of the second switch unit; the first control circuit is further configured to control an output of the first voltage output terminal by outputting a first power control signal through the first power control terminal.

In an embodiment of the present disclosure, the first connector further includes: a third pin for transmitting a third power supply signal; the pin length of the first pin, the pin length of the third pin, and the pin length of the second pin decrease in sequence; the first control circuit further includes: a second switch module, including a fourth switch unit, a fifth switch unit, and a sixth switch unit, a control terminal of the fourth switch unit is connected to the detection level signal, a first terminal of the fourth switch unit is connected to the third power supply signal through a voltage divider circuit, and a second terminal of the fourth switch unit is grounded; a control terminal of the fifth switch unit is connected to the first terminal of the fourth switch unit, a first terminal of the fifth switch unit is connected to the third power supply signal through another voltage divider circuit, and a second terminal of the fifth switch unit is grounded; a control terminal of the sixth switch unit is connected to the first terminal of the fifth switch unit, the first terminal of the sixth switch unit is connected to the third power supply signal, and the second terminal of the sixth switch unit is connected to the third voltage output terminal; the first control circuit is configured to control the output of the third voltage output terminal based on the detection level signal.

In an embodiment of the present disclosure, the first control circuit further includes: a second power control terminal connected to the first terminal of the fifth switch unit; the first control circuit is further configured to output a second power supply control signal through the second power control terminal to control the output of the third voltage output terminal.

In an embodiment of the present disclosure, the first connector further includes: a fourth pin for transmitting a fourth power supply signal; the pin length of the first pin, the pin length of the fourth pin, and the pin length of the second pin decrease in sequence; the first control circuit further includes: a third switch module, including a seventh switch unit, an eighth switch unit, and a ninth switch unit, a control terminal of the seventh switch unit is connected to the detection level signal, a first terminal of the seventh switch unit receives the fourth power supply signal through a voltage divider circuit, and a second terminal of the seventh switch unit is grounded; a control terminal of the eighth switch unit is connected to the first terminal of the seventh switch unit, a first terminal of the eighth switch unit receives the fourth power supply signal through another voltage divider circuit, and a second terminal of the eighth switch unit is grounded; a control terminal of the ninth switch unit is connected to the first terminal of the eighth switch unit, a first terminal of the ninth switch unit receives the fourth power supply signal, and a second terminal of the ninth switch unit is connected to the fourth voltage output terminal; the first control circuit is configured to control the output of the fourth voltage output terminal based on the detection level signal.

In an embodiment of the present disclosure, the first control circuit further includes: a third power control terminal connected to the first terminal of the eighth switch unit; the first control circuit is further configured to output a third power control signal through the third power control terminal to control the output of the fourth voltage output terminal.

In an embodiment of the present disclosure, the V BY ONE data signal includes a first sub-data signal; the second control circuit is configured to output a first display control signal through the second signal transmission module, and the first control circuit is configured to obtain the first display control signal through the first signal transmission module; the first connector further includes: a plurality of fifth pins for transmitting the first sub-data signal; a plurality of sixth pins for transmitting the first display control signal, and the first display control signal is configured to instruct the first control circuit to output the first sub-data signal.

In an embodiment of the present disclosure, the display unit includes a second control circuit; the first control circuit is further configured to output a first communication signal to communicate with the second control circuit to adjust the first display parameter of the display unit; the sixth pin, the twenty-sixth pin, the thirty-sixth pin, and the forty-sixth pin are further configured to transmit the first communication signal.

In an embodiment of the present disclosure, the V BY ONE data signal further includes a second sub-data signal; the first signal transmission module and the second signal transmission module are further configured to transmit an optical signal corresponding to a second display control signal; the first connector further includes: a plurality of seventh pins for transmitting the second sub-data signal; and a plurality of eighth pins for transmitting the second display control signal.

In an embodiment of the present disclosure, the V BY ONE data signal includes a first sub-data signal; the first signal transmission module and the second signal transmission module are further configured to transmit a first display control signal; the first signal transmission module includes: a first photoelectric unit, configured to convert the first sub-data signal into an optical signal for transmission; a second photoelectric unit, including a first channel, the second photoelectric unit is configured to receive the optical signal corresponding to the first display control signal through the first channel, and convert the corresponding optical signal into the first display control signal, the first display control signal is configured to instruct the first control circuit to output the first sub-data signal.

In an embodiment of the present disclosure, the V BY ONE data signal further includes a second sub-data signal; the first signal transmission module and the second signal transmission module are further configured to transmit an optical signal corresponding to a second display control signal; the second photoelectric unit further includes a second channel, the second photoelectric unit is further configured to convert the second display control signal into an optical signal for transmission through the second channel; the first signal transmission module further includes: a third photoelectric unit, configured to convert the second sub-data signal into an optical signal for transmission.

In an embodiment of the present disclosure, the first switch unit and the second switch unit are both transistors, and the third switch unit is a MOS transistor; and/or, the fourth switch unit and the fifth switch unit are both transistors, and the sixth switch unit is a MOS transistor; and/or, the seventh switch unit and the eighth switch unit are both transistors, and the ninth switch unit is a MOS transistor.

According to the third aspect of the present disclosure, there is also provided a display end of a display device, including: a second signal transmission module, configured to convert a received optical signal into a corresponding V BY ONE data signal; a display module, connected to the second signal transmission module, configured to obtain the V BY ONE data signal for image display.

In an embodiment of the present disclosure, the display module includes: a backlight unit, including a backlight driving board and a backlight source, the backlight driving board is connected between the second signal transmission module and the backlight source, and the backlight unit is configured to obtain a first power supply signal to drive the backlight source to emit light; a display unit, including a second control circuit, the second control circuit is connected to the second signal transmission module, and the second control circuit is configured to display image in response to the V BY ONE data signal.

In an embodiment of the present disclosure, the display module further includes: a step-down unit connected between a power output terminal of the backlight driving board and a power input terminal of the second control circuit, and the step-down unit is configured to output a fifth power supply signal according to the output voltage of the backlight driving board to power the second control circuit.

In an embodiment of the present disclosure, the display module further includes a step-down unit connected between a power input terminal of the display unit and the second signal transmission module, and the step-down unit is configured to receive the first power supply signal and output a fifth power supply signal according to the first power supply signal to power the display unit.

In an embodiment of the present disclosure, the second control circuit includes: a detection level output terminal, and the second control circuit is configured to output a detection level signal through the detection level output terminal.

In an exemplary embodiment of the present disclosure, the display terminal further includes a second connector, and the second connector includes: a 21st pin for transmitting a first power supply signal, the first power supply signal is configured to power the backlight unit; a 22nd pin for transmitting a detection level signal, the detection level signal is configured to instruct the first control circuit of the signal source end to control the output of the first power supply signal; where the pin length of the 21st pin is greater than the pin length of the 22nd pin.

In an embodiment of the present disclosure, the second connector further includes: a 23rd pin for transmitting a third power supply signal, the third power supply signal is configured to power the display unit; a 24th pin for transmitting a fourth power supply signal, the fourth power supply signal is configured to power the second signal transmission module; the pin length of the 24th pin is the same as the pin length of the 23rd pin, and the pin lengths of the 21st pin, the 23rd pin, and the 22nd pin decrease in sequence.

In an embodiment of the present disclosure, the detection level signal is further configured to instruct the first control circuit of the signal source end to control the output of the third power supply signal and/or control the output of the fourth power supply signal.

In an embodiment of the present disclosure, the V BY ONE data signal includes a first sub-data signal; the first signal transmission module and the second signal transmission module are further configured to transmit an optical signal corresponding to a first display control signal; the second connector further includes: a twenty-fifth pin for transmitting the first sub-data signal; and a twenty-sixth pin for transmitting the first display control signal.

In an embodiment of the present disclosure, the first signal transmission module and the second signal transmission module are further configured to transmit an optical signal corresponding to a second display control signal; the second connector further includes: a twenty-eighth pin for transmitting the second display control signal.

In an embodiment of the present disclosure, the V BY ONE data signal further includes a second sub-data signal; the second connector further includes a twenty-seventh pin for transmitting the second sub-data signal.

In an embodiment of the present disclosure, the V BY ONE data signal includes a first sub-data signal; the first signal transmission module and the second signal transmission module are further configured to transmit an optical signal corresponding to a first display control signal; the second signal transmission module includes: a fourth photoelectric unit configured to convert an optical signal corresponding to the first sub-data signal into the first sub-data signal; a fifth photoelectric unit, including a first channel, the fifth photoelectric unit is configured to convert the first display control signal into an optical signal for transmission through the first channel.

In an embodiment of the present disclosure, the V BY ONE data signal includes a first sub-data signal; the first signal transmission module and the second signal transmission module are further configured to transmit an optical signal corresponding to a second display control signal; the fifth optoelectronic unit further includes a second channel, and the fifth optoelectronic unit is configured to convert the optical signal corresponding to the second display control signal into the second display control signal through the second channel for output; the second signal transmission module further includes: a sixth optoelectronic unit, configured to convert the optical signal corresponding to the second sub-data signal into the second sub-data signal.

According to a fourth aspect of the present disclosure, there is also provided a transmission part of a display device, including: an optical fiber, and the transmission part is configured to transmit an optical signal through the optical fiber.

In an embodiment of the present disclosure, the optical fiber includes: a first sub-optical fiber, configured to transmit an optical signal corresponding to the first sub-data signal; a second sub-optical fiber, configured to transmit an optical signal corresponding to the first display control signal.

In an embodiment of the present disclosure, the optical fiber further includes: a fourth sub-optical fiber, configured to transmit an optical signal corresponding to the second display control signal; and a third sub-optical fiber, configured to transmit an optical signal corresponding to the second sub-data signal.

In an embodiment of the present disclosure, the transmission part further includes: a first power line for transmitting a first power supply signal, and the first power supply signal is configured to power the backlight unit of the display device at the display end.

In an embodiment of the present disclosure, the transmission part further includes: a third power line and/or a fourth power line, the third power line is configured to transmit the third power supply signal, the third power supply signal is configured to power the display unit of the display device at the display end; the fourth power line is configured to transmit the fourth power supply signal, the fourth power supply signal is configured to power the second signal transmission module at the display end.

In an embodiment of the present disclosure, the transmission part further includes: a second power line for transmitting a detection level signal.

In an embodiment of the present disclosure, the transmission part further includes: a third connector and a fourth connector, which are arranged at both ends of the transmission unit, the third connector is connected to the first connector, and the fourth connector is connected to the second connector; the third connector includes a thirty-first pin and a thirty-second pin, the fourth connector includes a forty-first pin and a forty-second pin, the thirty-first pin and the forty-first pin are configured to transmit a first power supply signal, the thirty-second pin and the forty-second pin are configured to transmit the detection level signal, where the first power supply signal is configured to power the backlight unit in the display module, and the detection level signal is configured to instruct the first control circuit at the signal source end to control the output of the first power supply signal.

In an embodiment of the present disclosure, the pin length of the 31st pin is greater than the pin length of the 32nd pin, and the pin length of the 41st pin is greater than the pin length of the 42nd pin; the transmission part is configured such that during the process of the third connector being separated from the first connector and the process of the fourth connector being connected to the second connector, the 31st pin is separated from the corresponding pin in the first connector before the 32nd pin, and the 41st pin is separated from the corresponding pin in the second connector before the 42nd pin; and during the process of the third connector being connected to the first connector and the process of the fourth connector being connected to the second connector, the 31st pin contacts the corresponding pin in the first connector before the 32nd pin, and the 41st pin contacts the corresponding pin in the second connector before the 42nd pin.

In an embodiment of the present disclosure, the third connector further includes: a thirty-third pin and a thirty-fourth pin, and the fourth connector further includes a forty-third pin and a forty-fourth pin, the thirty-third pin and the forty-third pin are configured to transmit a third power supply signal, and the third power supply signal is configured to power the display unit in the display module; the thirty-fourth pin and the forty-fourth pin are configured to transmit a fourth power supply signal, and the fourth power supply signal is configured to power the first signal transmission module and the second signal transmission module.

In an embodiment of the present disclosure, the pin length of the thirty-third pin is the same as the pin length of the thirty-fourth pin, and the pin lengths of the thirty-first pin, the thirty-third pin, and the thirty-second pin decrease in sequence; the transmission part is configured such that during the process of the third connector being separated from the first connector, the thirty-first pin is separated from the corresponding pin in the first connector or the second connector before the thirty-second pin and the thirty-third pin; and during the process of the third connector being connected to the first connector, the thirty-second pin and the thirty-third pin are contacted with the corresponding pin in the first connector or the second connector before the thirty-first pin.

In an embodiment of the present disclosure, the pin length of the 43rd pin is the same as the pin length of the 44th pin, and the pin lengths of the 41st pin, the 43rd pin, and the 42nd pin decrease in sequence; the transmission portion is configured such that during the process of the fourth connector being separated from the second connector, the 41st pin is separated from the corresponding pin in the first connector or the second connector before the 42nd pin and the 43rd pin; and during the process of the fourth connector being connected to the second connector, the 42nd pin and the 43rd pin are contacted with the corresponding pin in the first connector or the second connector before the 41 st pin.

In an embodiment of the present disclosure, the V BY ONE data signal includes a first sub-data signal; the first signal transmission module and the second signal transmission module are further configured to transmit an optical signal corresponding to a first display control signal; the third connector includes a thirty-fifth pin and a thirty-sixth pin, and the fourth connector further includes a forty-fifth pin and a forty-sixth pin, the thirty-fifth pin and the forty-fifth pin are configured to transmit the first sub-data signal; the thirty-sixth pin and the forty-sixth pin are configured to transmit the first display control signal.

In an embodiment of the present disclosure, the first signal transmission module and the second signal transmission module are further configured to transmit an optical signal corresponding to a second display control signal, the third connector further includes a thirty-eighth pin, the fourth connector further includes a forty-eighth pin, the thirty-eighth pin and the forty-eighth pin are configured to transmit the second display control signal.

In an embodiment of the present disclosure, the V BY ONE data signal includes a second sub-data signal; the third connector further includes: a thirty-seventh pin, the fourth connector further includes a forty-seventh pin, the thirty-seventh pin and the forty-seventh pin are configured to transmit the second sub-data signal.

It should be understood that the above general description and the detailed description below are only exemplary and explanatory, and cannot limit the present disclosure.

BRIEF DESCRIPTION OF THE DRAWINGS

The drawings herein are incorporated into the specification and constitute a part of the specification, showing embodiments consistent with the present disclosure, and are used together with the specification to explain the principles of the present disclosure. Obviously, the drawings described below are only some embodiments of the present disclosure. For those skilled in the art, other drawings can be obtained based on these drawings without creative work.

DETAILED DESCRIPTION

Figure 1:
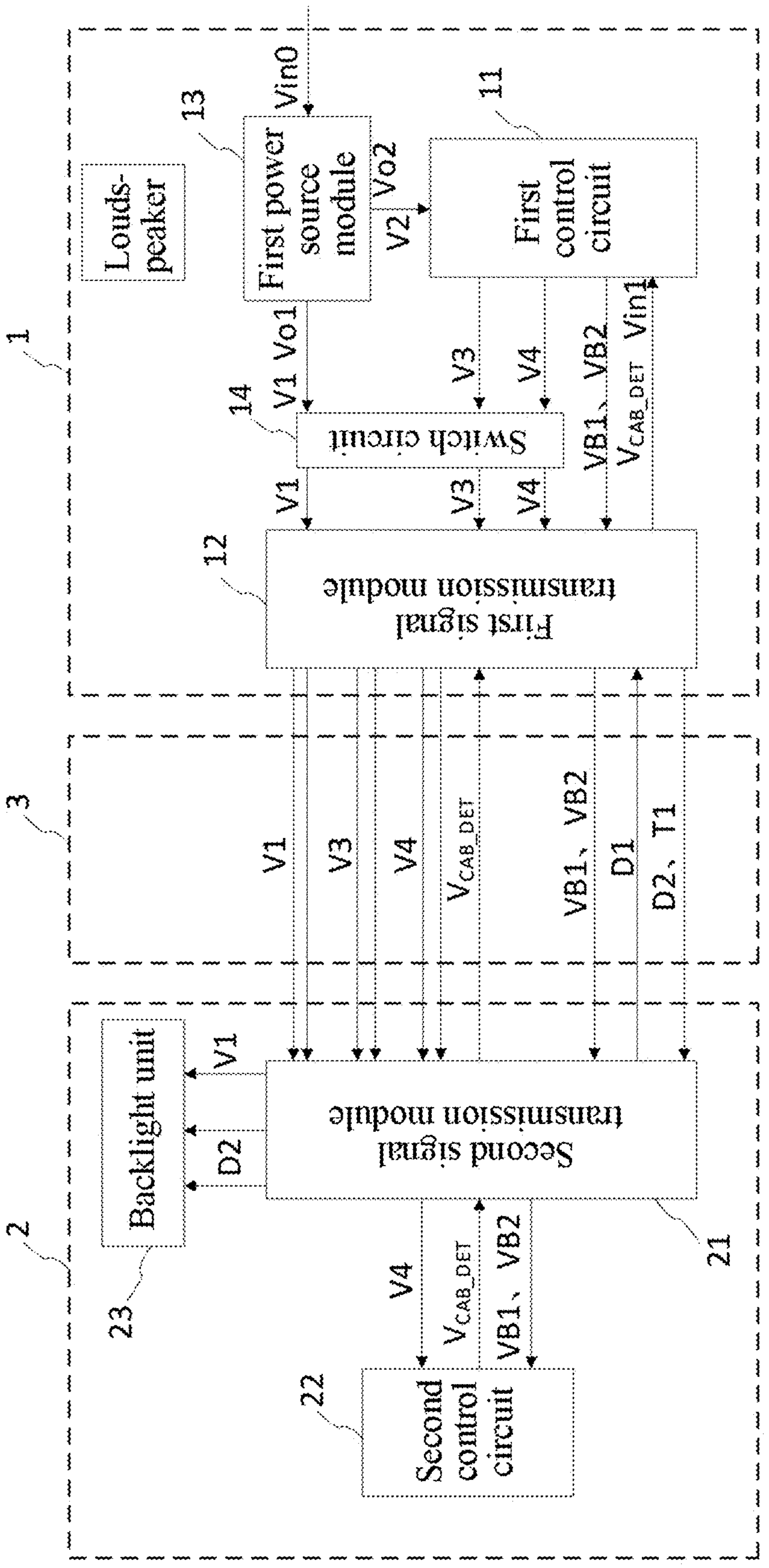
FIG. 1 is a structural schematic diagram of a display device according to an embodiment of the present disclosure.

Example embodiments will now be described more fully with reference to the accompanying drawings. However, example embodiments can be implemented in a variety of forms and should not be construed as limited to the embodiments set forth herein; rather, these embodiments are provided so that the present disclosure will be comprehensive and complete and the concepts of the example embodiments will be fully conveyed to those skilled in the art. The same reference numerals in the figures represent the same or similar structures, and their detailed descriptions will be omitted. In addition, the drawings are only schematic illustrations of the present disclosure and are not necessarily drawn to scale.

Although relative terms, such as "up" and "down" are used in this specification to describe the relative relationship of one component indicated by an icon to another component, these terms are used in this specification only for convenience. For example, according to the direction of the example described in drawings, it will be understood that if the device indicated by the icon is turned upside down, the component described as being "up" would become the component being "down". When a structure is "on" another structure, it may mean that the structure is integrally formed on the other structure, or that the structure is "directly" placed on the other structure, or that the structure is "indirectly" placed on the other structure through another structure.

The terms "one", "an", "the", "said" and "at least one" are used to indicate the presence of one or more elements/components/etc.; the terms "including" and "having" are used to indicate an open-ended inclusion and mean that there may be other elements/components/etc. in addition to the listed elements/components/etc.; the terms "first", "second" and "third" are used only as labels and are not intended to limit the number of their objects.

An embodiment of the present disclosure provides a display device, and FIG. 1 is a structural schematic diagram of a display device according to an embodiment of the present disclosure. The display device may be a television or other display device. Referring to FIG. 1, the display device may include a signal source end 1, a transmission part 3 and a display end 2. The signal source end 1 the display end 2 are separately arranged and connected via the transmission part 3. The signal source end 1 may include a first control circuit 11 and a first signal transmission module 12. The first control circuit 11 is configured to output a V BY ONE data signal. The first signal transmission module 12 is connected to the first control circuit 11. The first signal transmission module 12 is configured to obtain the V BY ONE data signal and convert the V BY ONE data signal into an optical signal for transmission. The transmission part 3 includes an optical fiber. The display end 2 includes a second signal transmission module 21 and a display module. The second signal transmission module 21 is connected to the first signal transmission module 12 via the optical fiber. The second signal transmission module 21 is configured to convert the received optical signal into a corresponding V BY ONE data signal. The display module is connected to the second signal transmission module 21. The display module is configured to obtain the V BY ONE data signal for image display.

The display device provided by the present disclosure sets the signal source end 1 and the display end 2 separately. By setting the first signal transmission module 12 at the signal source end 1 and the second signal transmission module 21 at the display end 2, the first signal transmission module 12 and the second signal transmission module 21 are connected by the optical fiber to transmit the V BY ONE data signal. Compared with the existing integrated architecture of the signal source and the display device, the thickness of the display device can be effectively reduced, the screen is thinner, and when the display device needs to be upgraded and maintained, only the signal source end device needs to be disassembled or replaced without disassembling the display device, so the maintenance cost of the display device can be effectively reduced.

The display device described in the present disclosure can be a TV or other display device with a display screen. The present disclosure only takes the TV as an example to illustrate the overall architecture and components of the display device. For example, the display device is a TV. By setting the signal source end 1 and the display end 2 separately, a split TV architecture can be formed. The split TV can meet the needs of higher resolution, the screen can be ultra-thin, and the transmission part 3 can be longer, which can be suitable for remote control screens such as projectors. The first control circuit 11 may be a mainboard. The display module may be an LCD display module or other display modules. The display module may include a backlight unit and a display unit. The backlight unit 23 obtains the first power supply signal V1 to emit light. The display unit may include a second control circuit 22. The second control circuit 22 may be a TCON board. The second control circuit 22 and the backlight unit are usually located on different circuit boards. The second control circuit 22 obtains the V BY ONE data signal for image display. The first signal transmission module 12 and the second signal transmission module 21 may be photoelectric converters (capable of photoelectric signal conversion and electro-optical signal conversion). The first signal transmission module 12 may convert the V BY ONE data signal of the signal source end 1 into an optical signal, and then transmit it to the second signal transmission module 21 through an optical fiber. The second signal transmission module 21 then converts the optical signal into a corresponding V BY ONE data signal for output, so as to display the image on the display end. Compared with the traditional use of electronic wires to transmit data signals (such as transmitting image signals based on the HDMI interface), the display device according to the present disclosure uses V BY ONE data signals to transmit image signals, and transmits V BY ONE data signals through optical fibers, which has the advantages of large signal capacity, no electromagnetic interference, wide transmission bandwidth, long transmission distance, low transmission loss, thin wire diameter, light weight, etc. On the basis of realizing the split TV architecture, the transmission line can be made longer and thinner, which is convenient for supporting the screen connection of other external devices, such as projectors, exhibition hall speakers, etc. In addition, the TCON board of the current high-definition display device mainly obtains image signals through V BY ONE data signal. Compared with the display technology that uses the HDMI interface to transmit image signals, such as the solution of using optical fiber to transmit HDMI signals, the display device according to the present disclosure directly uses optical fiber to transmit V BY ONE data signal to transmit image signal. The display device does not need to perform signal conversion, thereby reducing the use of the adapter board for converting HDMI signal to V BY ONE data signal, which can save costs, reduce space occupancy, and reduce compatibility issues, and improve the reliability of the display device.

It should be understood that the first signal transmission module 12 and the first control circuit 11 according to the present disclosure can be integrated into the same circuit board, or they can be separately set on different circuit boards. Similarly, the second signal transmission module 21 and the second control circuit 22 can be integrated on the same circuit board, or separately set on different circuit boards. These all belong to the protection scope of the present disclosure.

The present disclosure can realize the split architecture of the TV by integrating a photoelectric converter on the main board and another photoelectric converter on the TCON board of the LCD display module, without the need to set up an additional adapter board, which can save space and cost, making the display device more compact and lightweight.

The signal source end 1 of the display device of the present disclosure can be set in an audio box (external speaker) to form an independent device. When the display device needs to be repaired or upgraded, only the audio box needs to be disassembled or replaced, and the TV does not need to be replaced. Compared with the traditional integrated TV, the display device provided by the present disclosure has the advantages of low cost and high efficiency. The display device of the present disclosure uses V BY ONE data signal to transmit image signals. The V BY ONE interface has low power consumption and supports data transmission up to 4 Gbps (effective data volume reaches 3.2 Gbps), etc., which can replace the traditional LVDS interface. For a UHD 60 Hz TV panel, the V BY ONE interface only requires 18 wires ((18−2)/2−8 lane), and for a UHD 120 Hz TV panel, the V BY ONE interface only requires 34 wires ((34−2)/2=16 lane). The display device provided by the present disclosure is compatible with traditional TV mainboard, has a high degree of standardization, and the optical fiber transmission method can achieve extremely long-distance signal transmission.

Figure 2:
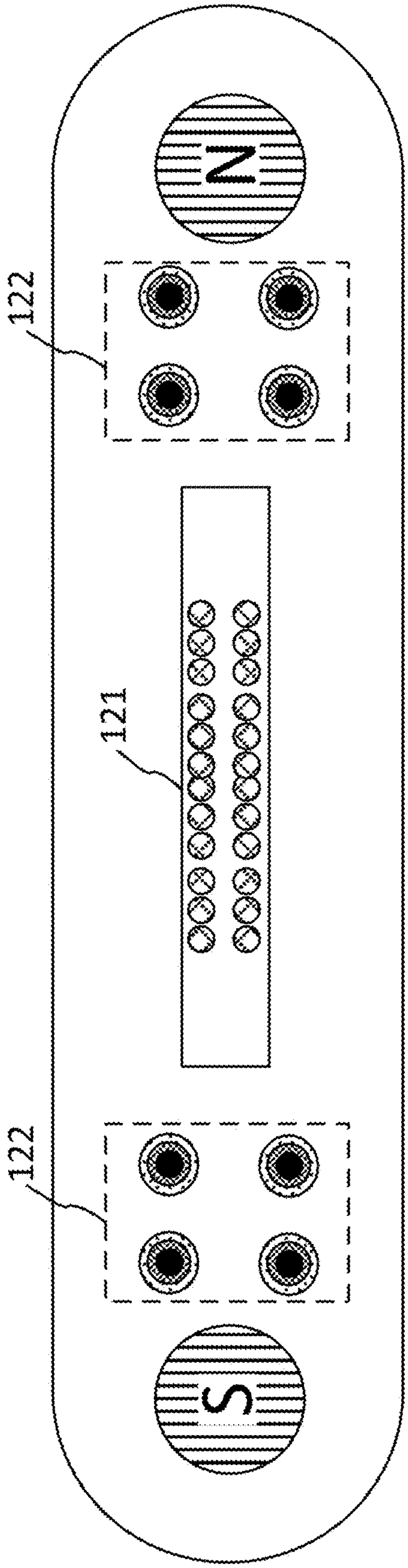
FIG. 2 is an interface structure schematic diagram of a signal transmission module according to an embodiment of the present disclosure.

The power supply part of the display device of the present disclosure is introduced below in conjunction with the accompanying drawings. As shown in FIG. 1, in an exemplary embodiment, the signal source end 1 may include a first power source module 13. The first power source module 13 may be an AC-DC power supply that converts the input AC power into DC power for output. The first power source module 13 may include a voltage input end Vin0, a first voltage output end Vo1, and a second voltage output end Vo2. The voltage input end Vin0 is connected to the mains, the first voltage output terminal Vo1 is connected to the first signal transmission module 12, and the second voltage output end Vo2 is connected to the first control circuit 11. On the one hand, the first power source module 13 outputs a first power supply signal V1 to the first signal transmission module 12 through the first voltage output terminal Vo1, and the first power supply signal V1 can be transmitted to the second signal transmission module 21 through the first signal transmission module 12, thereby powering the backlight source of the display end 2. On the other hand, the first power source module 13 outputs a second power supply signal V2 to the first control circuit 11 through the second voltage output end Vo2, thereby powering the first control circuit 11. It should be understood that, in an exemplary embodiment, the first signal transmission module 12 and the second signal transmission module 21 may be optoelectronic mixers. The optoelectronic mixer may be understood as a device having both a structure for transmitting optical signals and a structure for transmitting electrical signals. For example, FIG. 2 is a schematic diagram of the interface structure of a signal transmission module according to an embodiment of the present disclosure. The first signal transmission module 12 and the second signal transmission module 21 may have the interface shown in FIG. 2. The first signal transmission module 12 and the second signal transmission module 21 are connected to the transmission part 3 through the interface. As shown in FIG. 2, the middle part 121 of the interface is an optical lens, which cooperates with the optical fiber in the transmission part 3 to transmit the optical signal. Both side parts 122 of the interface are power line structures, which can be connected to the copper wire in the transmission part 3 to transmit the power supply signal.

In an exemplary embodiment, the first signal transmission module is connected between the first power source module and the power line. The first power source module can be directly connected to the first signal transmission module, and the first signal transmission module is then connected to the power line; and/or, the first power source module is first connected to the first control circuit, connected to the first signal transmission module through the first control circuit, and then connected to the power line by the first signal transmission module. For example, the first power source module can output the first power supply signal V1 by directly connecting to the first signal transmission module, and the first power source module can output the third power supply signal V3 and the fourth power supply signal V4 by connecting to the first signal transmission module through the first control circuit.

The first control circuit 11 can be powered by the second power supply signal V2, and the first control circuit 11 can output a third power supply signal V3 and a fourth power supply signal V4. The third power supply signal V3 is transmitted to the display end 2, and can be configured to power the second control circuit 22 of the display end 2 (i.e., power supply for screen display), and the fourth power supply signal V4 can be configured to power the first signal transmission module 12 and the second signal transmission module 21. In an exemplary embodiment, the first power supply signal V1 can be a DC voltage signal of 200V to 400V, 2 A. In one embodiment of the present disclosure, the first power supply signal V1 is a DC voltage signal of 380V, 2 A. The first power supply signal V1 is transmitted to the display end 2 to power the backlight source in the display module 2. For example, the second signal transmission module 21 can output the first power supply signal V1 to the backlight driving board of the display module 2, and the backlight driving board then steps down the 380V voltage to 25V voltage and outputs it to the backlight source of the display module 2 to power the backlight source. The third power supply signal V3 and the fourth power supply signal V4 may be 12V voltage signals, and the current magnitudes of the third power supply signal V3 and the fourth power supply signal V4 may be different. The third power supply signal V3 may be a 12V, 4 A voltage signal, and the fourth power supply signal V4 may be a 12V, 2 A voltage signal. The third power supply signal V3 and the fourth power supply signal V4 are two independent power supply signals, and timing control may be performed by independently controlling the two power supply signals. This exemplary embodiment may utilize the existing 12V power supply port in the first control circuit 11 to output two 12V voltages as the third power supply signal V3 and the fourth power supply signal V4, respectively. In addition, in some embodiments of the present disclosure, the first power source module 13 may also output a 5V power supply signal to the first control circuit 11 for powering the related devices in the first control circuit 11 and output a 5V SB (Standby) power supply signal for providing a 5V Standby voltage to the first control circuit 11. Of course, the first power source module 13 can also output other power supply signals, such as outputting a 3.3V power supply signal to power the related devices in the first control circuit 11, etc., which depends on the power supply requirements of the active devices of the first control circuit 11, which will not be described in detail here.

Figure 3:
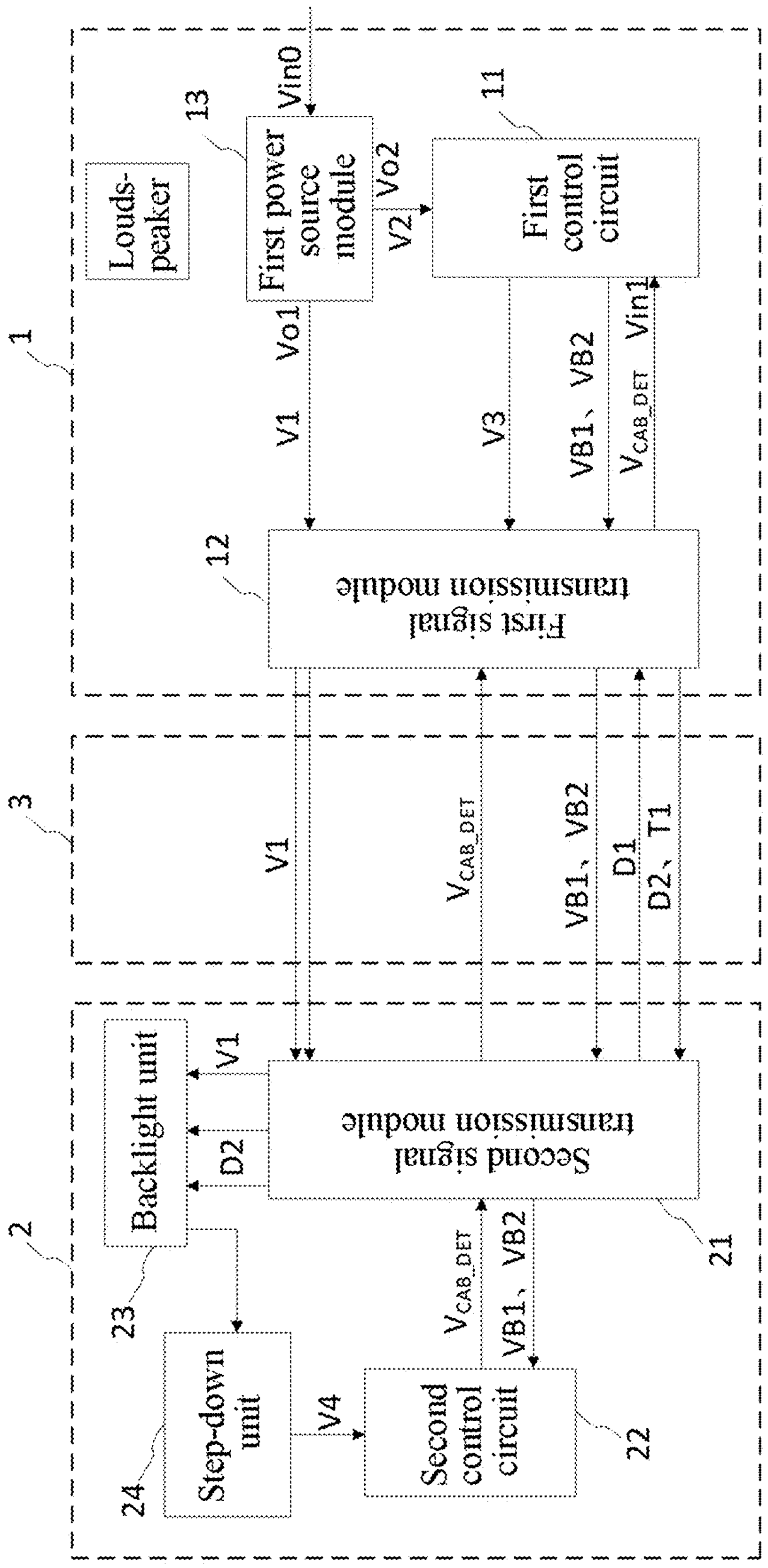
FIG. 3 is a structural schematic diagram of a display device according to another embodiment of the present disclosure.
Figure 4:
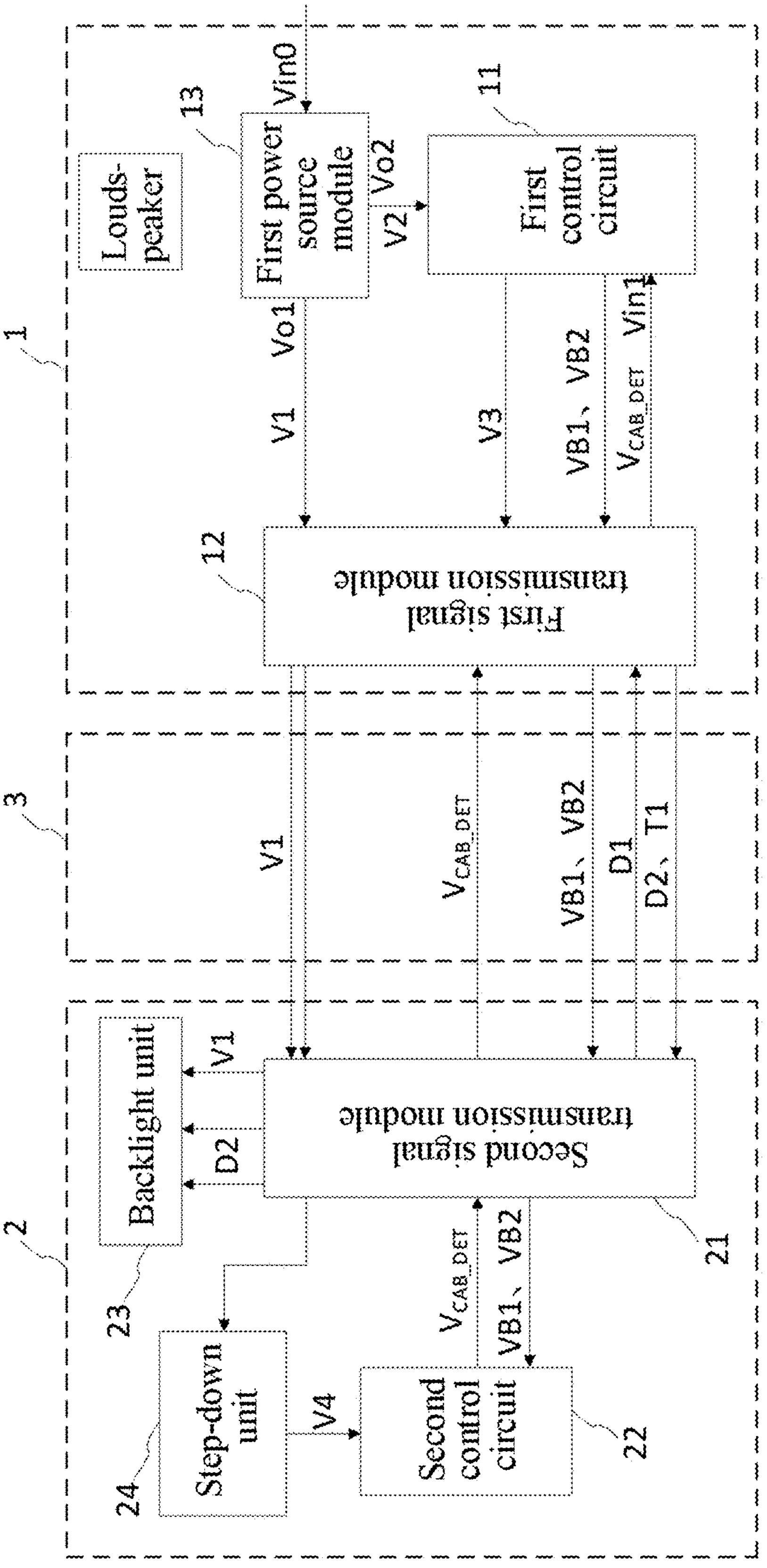
FIG. 4 is a structural schematic diagram of a display device according to another embodiment of the present disclosure.

FIG. 3 is a structural schematic diagram of a display device according to another embodiment of the present disclosure. As shown in FIG. 3, in another embodiment of the present disclosure, the display end 2 can also include a step-down unit 24, which is configured to output a fifth power supply signal. The step-down unit 24 can be connected between the power output end of the backlight driving board and the power input end of the second control circuit 22. The step-down unit 24 can output the fifth power supply signal using the output voltage of the backlight driving board. FIG. 4 is a structural schematic diagram of a display device according to another embodiment of the present disclosure. As shown in FIG. 4, in another embodiment of the present disclosure, the step-down unit 24 can be connected between the power input end of the display unit and the second signal transmission module 21. The step-down unit 24 directly steps down the received first power supply signal V1 and outputs the fifth power supply signal to power the display unit. The fifth power supply signal can be a 12V voltage signal, which can have the same voltage characteristics as the third power supply signal V3 mentioned above. The step-down unit 24 can be a BUCK power supply. In the structure shown in FIG. 3, the step-down unit 24 can convert the 25V power supply voltage for the backlight driving board into a 12V voltage to power the display unit. In the structure shown in FIG. 4, the step-down unit 24 can directly step down the first power supply signal V1 to obtain a 12V voltage to power the display unit.

In the structure in which the display end 2 has the step-down unit 24 as shown in FIG. 3 and FIG. 4, there is no need to output the third power supply signal V3 of 12V from the signal source end 1 to the display end 2, because the step-down unit 24 and the second control circuit 22 are both in the display end 2, thus there is no problem of voltage drop loss of the line, and thus a stable power supply voltage can be provided for the second control circuit 22, thereby avoiding abnormal display of the display screen due to voltage drop loss of the line. Under this structure, the first control circuit 11 supplies power to the first signal transmission module 12 by outputting the fourth power supply signal V4, and the power supply voltage for the second signal transmission module 21 can be provided by the step-down unit 24, thereby reducing the arrangement of a pair of power lines between the first signal transmission module 12 and the second signal transmission module 21, that is, the transmission part 3 can reduce a pair of power lines accordingly. Of course, in other embodiments of the present disclosure, the first control circuit on the display end can also output a 12V voltage to simultaneously power the first signal transmission module at the signal source end and the second signal transmission module at the display end, that is, the fifth power supply signal output by the second power source module at the display end is only configured to power the display unit, which all belong to the protection scope of the present disclosure.

As shown in FIG. 1, in an exemplary embodiment, in order to transmit the above-mentioned power supply signal, the transmission part 3 may include a plurality of power lines, and the power lines may be metal power lines, such as power copper lines. When the first control circuit 11 outputs the fourth power supply signal V4 to power the first signal transmission module 12 and the second signal transmission module 21, and outputs the third power supply signal V3 to power the second control circuit 22, the transmission part 3 may include 8 power lines, where the 8 power lines may include two first power lines for transmitting the first power supply signal V1, and two fourth power lines for transmitting the fourth power supply signal V4. Since the fourth power lines are respectively connected to the first signal transmission module 12 and the second signal transmission module 21, the fourth power lines can simultaneously power the first signal transmission module 12 and the second signal transmission module 21. Two third power lines are configured to transmit the third power supply signal V3. One second power line is configured to transmit the cable detection level signal $V_{CAB\_DET}$ and one spare line. It should be understood that, in the structure in which the step-down unit 24 outputs the fifth power supply signal to supply power to the second control circuit 22 as shown in FIG. 3 and FIG. 4, the number of power lines in the transmission part 3 can be reduced accordingly, such as only 6 power lines, two of which are configured to transmit the first power supply signal V1, two of which are configured to transmit the third power supply signal V3, one of which is configured to transmit the detection level signal $V_{CAB\_DET}$, and one of which is reserved. In an exemplary embodiment, the display device can implement the hot-plug function of the power interface based on the detection level signal $V_{CAB\_DET}$. For the implementation process of the hot-plug function, please refer to the introduction of the subsequent embodiments.

The signal source end 1 may include a first connector, the display end 2 may include a second connector, and the transmission part 3 may include a third connector and a fourth connector. It can be understood that the third connector and the fourth connector are electrically connected to transmit signals. The first connector is connected to the first control circuit 11 and the first power source module 13 respectively. The second connector is connected to the second control circuit 22 and the backlight unit 23 respectively. The first connector can cooperate with the third connector, and the second connector can cooperate with the fourth connector to establish a connection between the signal source end and the display end. It can be understood that the first connector of the signal source end 1 and the second connector of the display end 2 can have the same structure and pin definition, and the third connector and the fourth connector in the transmission part 3 can have the same structure and pin definition. The signal pin is described below by taking the first connector of the signal source end 1 as an example. The signal pin of the second connector can be the same as the pin of the first connector, and the detailed description thereof is omitted in this exemplary embodiment.

In the exemplary embodiment, the first control circuit further includes a detection level input end, and the first control circuit is configured to receive a detection level signal through the detection level input end. The display module further includes a detection level output end, and the display module is configured to output a detection level signal through the detection level output end. The power line further includes a second power line, and the second power line is configured to transmit a detection level signal. The detection level signal is configured to control the output of the first voltage output terminal, and/or, to control the output of the third voltage output terminal, and/or the output of the fourth voltage output terminal.

In the exemplary embodiment, the signal source end further includes a first connector. The display end further includes a second connector. The transmission part includes a third connector and a fourth connector. The third connector is configured to connect the first connector, and the fourth connector is configured to connect the second connector.

In an exemplary embodiment, the first connector may include a first pin and a second pin; the second connector may include a twenty-first pin and a twenty-second pin; the third connector may include a thirty-first pin and a thirty-second pin; and the fourth connector may include a forty-first pin and a forty-second pin. The thirty-first pin is configured to connect the first pin, the thirty-second pin is configured to connect the second pin, the forty-first pin is configured to connect the twenty-first pin, and the forty-second pin is configured to connect the twenty-second pin. The first pin, the twenty-first pin, the thirty-first pin, and the forty-first pin are configured to transmit a first power supply signal, and the second pin, the twenty-second pin, the thirty-second pin, and the forty-second pin are configured to transmit a detection level signal. The pin length of the first pin is greater than the pin length of the second pin or the pin length of the thirty-first pin is greater than the pin length of the thirty-second pin, and the pin length of the twenty-first pin is greater than the pin length of the twenty-second pin or the pin length of the forty-first pin is greater than the pin length of the forty-second pin.

In an exemplary embodiment, the first connector may further include a third pin and a fourth pin; the second connector may further include a twenty-third pin and a twenty-fourth pin; the third connector may further include a thirty-third pin and a thirty-fourth pin. The thirty-third pin is configured to connect the third pin, and the thirty-fourth pin is configured to connect the fourth pin. The fourth connector may further include a forty-third pin and a forty-fourth pin. The forty-third pin is configured to connect the twenty-third pin, and the forty-fourth pin is configured to connect the twenty-fourth pin.

The third pin, the twenty-third pin, the thirty-third pin, and the forty-third pin are configured to transmit a third power supply signal, and the fourth pin, the twenty-fourth pin, the thirty-fourth pin, and the forty-fourth pin are configured to transmit a fourth power supply signal. The pin length of the third pin is the same as the pin length of the fourth pin and the pin length of the first pin, and the pin length of the third pin, and the pin length of the second pin decrease in sequence, or the pin length of the thirty-third pin is the same as the pin length of the thirty-fourth pin and the pin length of the thirty-first pin, the pin length of the thirty-third pin, and the pin length of the thirty-second pin decrease in sequence; and the pin length of the twenty-third pin is the same as the pin length of the twenty-fourth pin and the pin length of the twenty-first pin, and the pin length of the twenty-third pin, and the pin length of the twenty-second pin decrease in sequence, or the pin length of the forty-third pin is the same as the pin length of the forty-fourth pin and the pin length of the forty-first pin, the pin length of the forty-third pin, and the pin length of the forty-second pin decrease in sequence.

In an exemplary embodiment, the V BY ONE data signal may include a first sub-data signal. The display module may further include a second control circuit. The second control circuit is configured to output a first display control signal through a second signal transmission module. The first control circuit is configured to obtain the first display control signal through the first signal transmission module. The first connector may further include a fifth pin and a sixth pin. The second connector may further include a twenty-fifth pin and a twenty-sixth pin. The third connector may further include a thirty-fifth pin and a thirty-sixth pin. The thirty-fifth pin is configured to connect the fifth pin, and the thirty-sixth pin is configured to connect the sixth pin. The fourth connector may further include a forty-fifth pin and a forty-sixth pin. The forty-fifth pin is configured to connect the twenty-fifth pin, and the forty-sixth pin is configured to connect the twenty-sixth pin. The fifth pin, the twenty-fifth pin, the thirty-fifth pin, and the forty-fifth pin are configured to transmit the first sub-data signal. The sixth pin, the twenty-sixth pin, the thirty-sixth pin, and the forty-sixth pin are configured to transmit the first display control signal. The first display control signal is configured to instruct the first control circuit to output the first sub-data signal.

In an exemplary embodiment, the display unit includes a second control circuit. The first control circuit is configured to output a second display control signal through a first signal transmission module, and the second control circuit is configured to obtain a second display control signal through a second signal transmission module. The first connector may further include an eighth pin. The second connector may further include a twenty-eighth pin. The third connector may further include a thirty-eighth pin, and the thirty-eighth pin is configured to connect the eighth pin. The fourth connector may further include a forty-eighth pin, and the forty-eighth pin is configured to connect the twenty-eighth pin. The eighth pin, the twenty-eighth pin, the thirty-eighth pin, and the forty-eighth pin are configured to transmit a second display control signal. The second display control signal is configured for the first control circuit to communicate with the second control circuit and/or the backlight unit to adjust the preset parameters in the second control circuit and/or the backlight unit.

In an exemplary embodiment, the display unit includes a second control circuit. The first control circuit is further configured to output a first communication signal to communicate with the second control circuit to adjust a first display parameter of the display unit. The eighth pin, the twenty-eighth pin, the thirty-eighth pin, and the forty-eighth pin are further configured to transmit the first communication signal.

It should be understood that the number of the fifth pin, the sixth pin, the seventh pin, and the eighth pin described in the present disclosure can be multiple. High-speed signals are transmitted through multiple fifth pins and multiple seventh pins, and low-speed signals are transmitted through multiple sixth pins and multiple eighth pins.

In an exemplary embodiment, the above-mentioned first display control signal D1 can be configured to instruct the first control circuit to output the first sub-data signal. The first communication signal T1 is configured for the first control circuit to communicate with the second control circuit to adjust the first display parameter of the display unit. The second display control signal D2 can be configured for the first control circuit to communicate with the second control circuit and/or the backlight unit to adjust the preset parameters in the second control circuit and/or the backlight unit. The preset parameters can include display parameters, backlight parameters, etc. The first sub-data signal VB1 and the second sub-data signal VB2 are V BY ONE data signals.

The first control circuit 11 described in the present disclosure can transmit the second display control signal D2 to the first signal transmission module 12 in a variety of ways.

For example, in some embodiments, the first connector may include a first terminal, a second terminal, and a third terminal. The first terminal may include a CN1 sub-connector. The second terminal may include a CN3 sub-connector, a CN4 sub-connector, and a CN5 sub-connector. The third terminal may include a CN2 sub-connector. In some other embodiments, the first connector may include only a first terminal and a second terminal. The first terminal may include a CN1 sub-connector. The second terminal may include a CN3 sub-connector, a CN4 sub-connector, and a CN5 sub-connector. The CN1 sub-connector may be, for example, a 51-pin sub-connector. The CN2 sub-connector may be, for example, a 41-pin sub-connector. The CN3 sub-connector and the CN4 sub-connector may be, for example, both 6-pin sub-connectors. The CN5 sub-connector may be, for example, a 3-pin sub-connector. In the case where the first connector includes a third terminal, the third terminal and the second terminal may be configured to receive the same second display control signal. For example, the first control circuit 11 may transmit the second display control signal D2 to the first signal transmission module 12 through the CN2 sub-connector, or the first control circuit 11 may transmit the second display control signal D2 to the first signal transmission module 12 through the CN3 sub-connector and the CN4 sub-connector. Further, the first control circuit 11 can transmit the BL signal and the ADJ signal to the first signal transmission module 12 through the CN3 sub-connector, and transmit the UART_TX signal and the UART_RX signal to the first signal transmission module 12 through the CN4 sub-connector. Alternatively, the first control circuit 11 can transmit the above-mentioned BL signal, ADJ signal, UART_TX signal, and UART_RX signal to the first signal transmission module 12 through the CN2 sub-connector. For the BL signal, ADJ signal, UART_TX signal, and UART_RX signal, please refer to the introduction of the subsequent embodiments, which will not be described in detail here.

The CN1 sub-connector, CN2 sub-connector, CN3 sub-connector, CN4 sub-connector, and CN5 sub-connector described in the present disclosure can be arranged on the same circuit board as the first signal transmission module 12.

It can be understood that the transmission of the second display control signal D2 to the first signal transmission module 11 through the CN3 sub-connector and the CN4 sub-connector in the second terminal can be compatible with those first control circuit boards without the 41-pin sub-connector, thereby improving the compatibility with the mainboard of the signal source end.

In addition, the first control circuit 11 can also transmit the fourth power supply signal V4 to the first signal transmission module 12 through the CN3 sub-connector in the second terminal, obtain the detection level signal $V_{CAB\_DET}$ transmitted by the first signal transmission module 12 through the CN4 sub-connector, and transmit the first power supply signal V1 to the first signal transmission module 12 through the CN5 sub-connector.

In an exemplary embodiment, the case where the V BY ONE data signal and the display control signal are transmitted through a first terminal and a second terminal can be applicable to a TV panel with a UHD 120 Hz resolution. As described above, the first terminal can include a 51-pin sub-connector, and the third terminal can include a 41-pin sub-connector. The 16-lane V BY ONE data signal is transmitted through a 51-pin sub-connector and a 41-pin sub-connector. The first 8 pairs of differential voltage difference signals are transmitted by the 51-pin sub-connector, and the last 8 pairs of differential voltage difference signals are transmitted by the 41-pin sub-connector. The first display control signal D1 in the low-speed signal is transmitted by the 51-pin sub-connector, and the second display control signal D2 in the low-speed signal is transmitted by the 41-pin sub-connector.

It should be understood that the first control circuit 11 should have a terminal that cooperates with the first signal transmission module 12. In other words, in a case where the first connector includes a first terminal, a second terminal, and a third terminal, the first control circuit 11 also has a terminal that cooperates with the first terminal, a terminal that cooperates with the second terminal, and a terminal that cooperates with the third terminal. For example, the first control circuit 11 may also include CN1 sub-connector, CN2 sub-connector, CN3 sub-connector, CN4 sub-connector and CN5 sub-connector above-mentioned.

The signals transmitted by the 51-pin sub-connector and the 41-pin sub-connector in the present disclosure are described in detail below.

Figure 5:
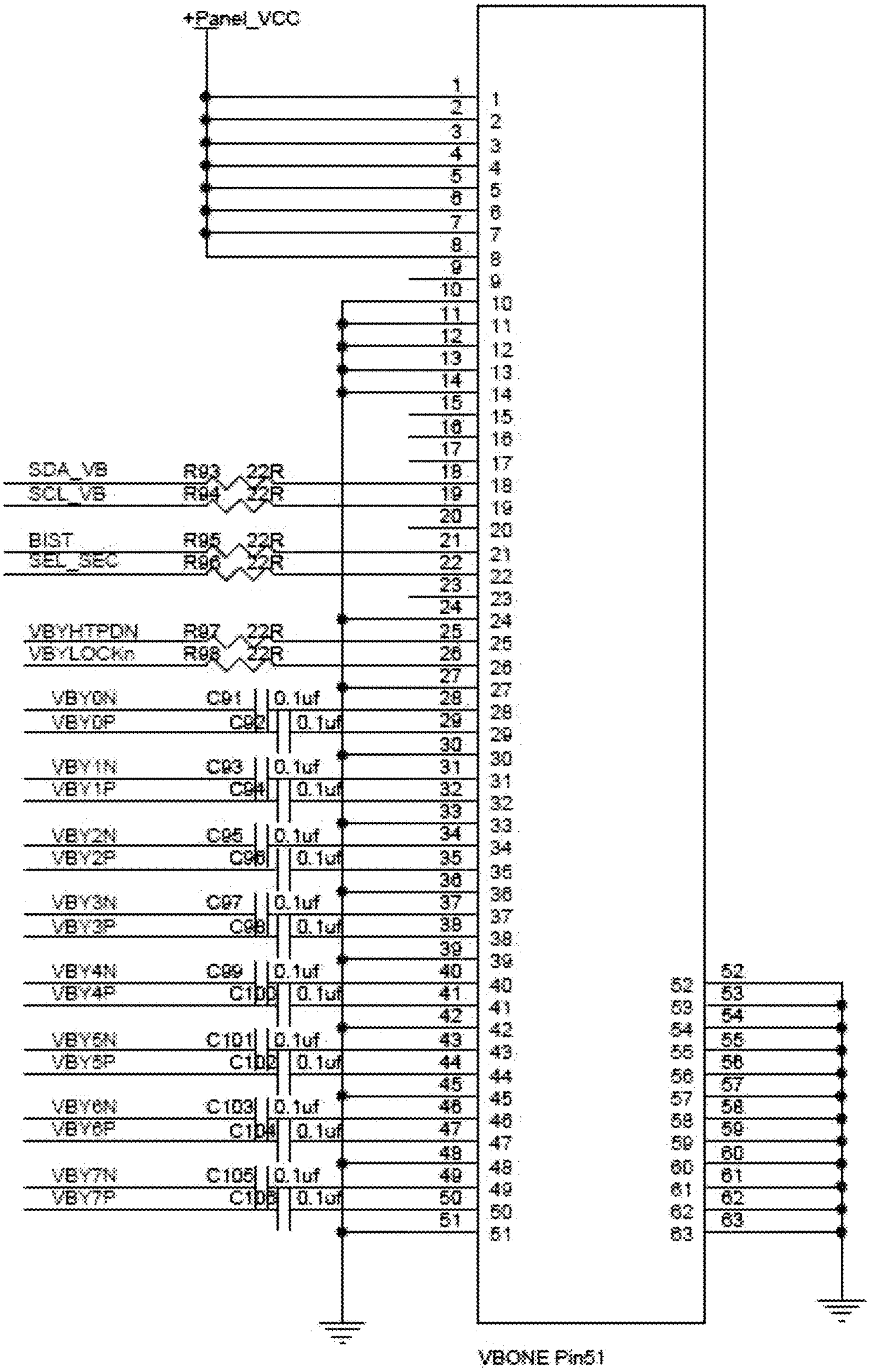
FIG. 5 is a signal connection schematic diagram of a 51-pin sub-connector according to an embodiment of the present disclosure.

FIG. 5 is a signal connection diagram of a 51-pin sub-connector according to an embodiment of the present disclosure. In an exemplary embodiment of the present disclosure, as shown in FIG. 5, the 51-pin sub-connector can be configured to transmit the first sub-data signal VB1, the first display control signal D1, the first communication signal T1 and the third power supply signal V3. The first sub-data signal VB1 may include multiple pairs of differential voltage difference signals, and the 28th to 29th pins, the 31st to 32nd pins, the 34th to 35th pins, the 37th to 38th pins, the 40th to 41st pins, the 43rd to 44th pins, the 46th to 47th pins, and the 49th to 50th pins of the 51-pin sub-connector can be configured to transmit the first sub-data signal VB1. The first display control signal D1 can be configured to feedback the connection status of the first signal transmission module 12 and the second signal transmission module 21 to the first control circuit 11, and instruct the first control circuit 11 to output the first sub-display signal when the first signal transmission module 12 and the second signal transmission module 21 are connected. The 18th, 19th, 25th and 26th pins of the 51-pin sub-connector can be configured to transmit the first display control signal D1. In addition, the 18th to 19th pins of the 51-pin sub-connector can be configured to transmit the first communication signal T1, and the 1st to 8th pins can be configured to transmit the third power supply signal V3. The 1st to 8th pins can be short-circuited to transmit the third power supply signal V3 of 12V, 4 A. The 10th to 14th pins, the 24th pin, the 27th pin, the 30th pin, the 33rd pin, the 36th pin, the 39th pin, the 42nd pin, the 45th pin, the 48th pin and the 51st pin of the 51-pin sub-connector are ground pins.

Table 1 is a description of the signals connected to each pin in the 51-pin sub-connector. It can be seen from Table 1 that the first sub-data signal VB1 transmitted in the 51-pin sub-connector may include 8 pairs of high-speed signals: (TX0N, TX0P), (TX1N, TX1P), (TX2N, TX2P), (TX3N, TX3P), (TX4N, TX4P), (TX5N, TX5P), (TX6N, TX6P), (TX7N, TX7P). The high-speed signal is a differential voltage difference signal and can be transmitted at a rate of several hundred Mbit/s. The first sub-data signal VB1 transmits the display data of the panel through individual channels in an AC-coupled manner. The first display control signal D1 transmitted in the 51-pin sub-connector may include 2 low-speed signals: HTPDN and LOCKN. The HTPDN signal (Hot Plug Detect Signal) is configured to feedback whether the second signal transmission module 21 is connected to the first signal transmission module 12. The LOCKN signal (Lock Clock Negative) is configured to feedback whether the TCON board decodes the clock signal output by the mainboard. The first communication signal T1 may include an SDA_P signal and an SCL_P signal. The SDA_P signal and the SCL_P signal are a group of IIC signals reserved for communication between the mainboard and the TCON board to adjust certain display parameters of the display module.

TABLE 1

| Pin No | Name | Description |
|---|---|---|
| 1 | VDD | Power Supply +12.0 V |
| 2 | VDD | Power Supply +12.0 V |
| 3 | VDD | Power Supply +12.0 V |
| 4 | VDD | Power Supply +12.0 V |
| 5 | VDD | Power Supply +12.0 V |
| 6 | VDD | Power Supply +12.0 V |
| 7 | VDD | Power Supply +12.0 V |
| 8 | VDD | Power Supply +12.0 V |
| 9 | NC | No Connection |
| 10 | GND | Ground |
| 11 | GND | Ground |
| 12 | GND | Ground |
| 13 | GND | Ground |
| 14 | GND | Ground |
| 15 | NC | No Connection |
| 16 | NC | No Connection |
| 17 | NC | No Connection |
| 18 | SDA_P | SDA_P |
| 19 | SCL_P | SCL_P |
| 20 | NC | No Connection |
| 21 | Aging (BIST) | H: Enable(Default) L: Disable |
| 22 | SEL_SECTION | H: 2 Section L: 1 Section(Default) |
| 23 | NC | No Connection |
| 24 | GND | Ground |
| 25 | HTPDN | HOT Plug Detect |
| 26 | LOCKN | Lock Detect |
| 27 | GND | Ground |
| 28 | TX0N | Negative VbyOne differential data output |
| 29 | TX0P | Positive VbyOne differential data output |
| 30 | GND | Ground |
| 31 | TX1N | Negative VbyOne differential data output |
| 32 | TX1P | Positive VbyOne differential data output |
| 33 | GND | Ground |
| 34 | TX2N | Negative VbyOne differential data output |
| 35 | TX2P | Positive VbyOne differential data output |
| 36 | GND | Ground |
| 37 | TX3N | Negative VbyOne differential data output |
| 38 | TX3P | Positive VbyOne differential data output |
| 39 | GND | Ground |
| 40 | TX4N | Negative VbyOne differential data output |
| 41 | TX4P | Positive VbyOne differential data output |
| 42 | GND | Ground |
| 43 | TX5N | Negative VbyOne differential data output |
| 44 | TX5P | Positive VbyOne differential data output |
| 45 | GND | Ground |
| 46 | TX6N | Negative VbyOne differential data output |
| 47 | TX6P | Positive VbyOne differential data output |
| 48 | GND | Ground |
| 49 | TX7N | Negative VbyOne differential data output |
| 50 | TX7P | Positive VbyOne differential data output |
| 51 | GND | Ground |

Figure 6:
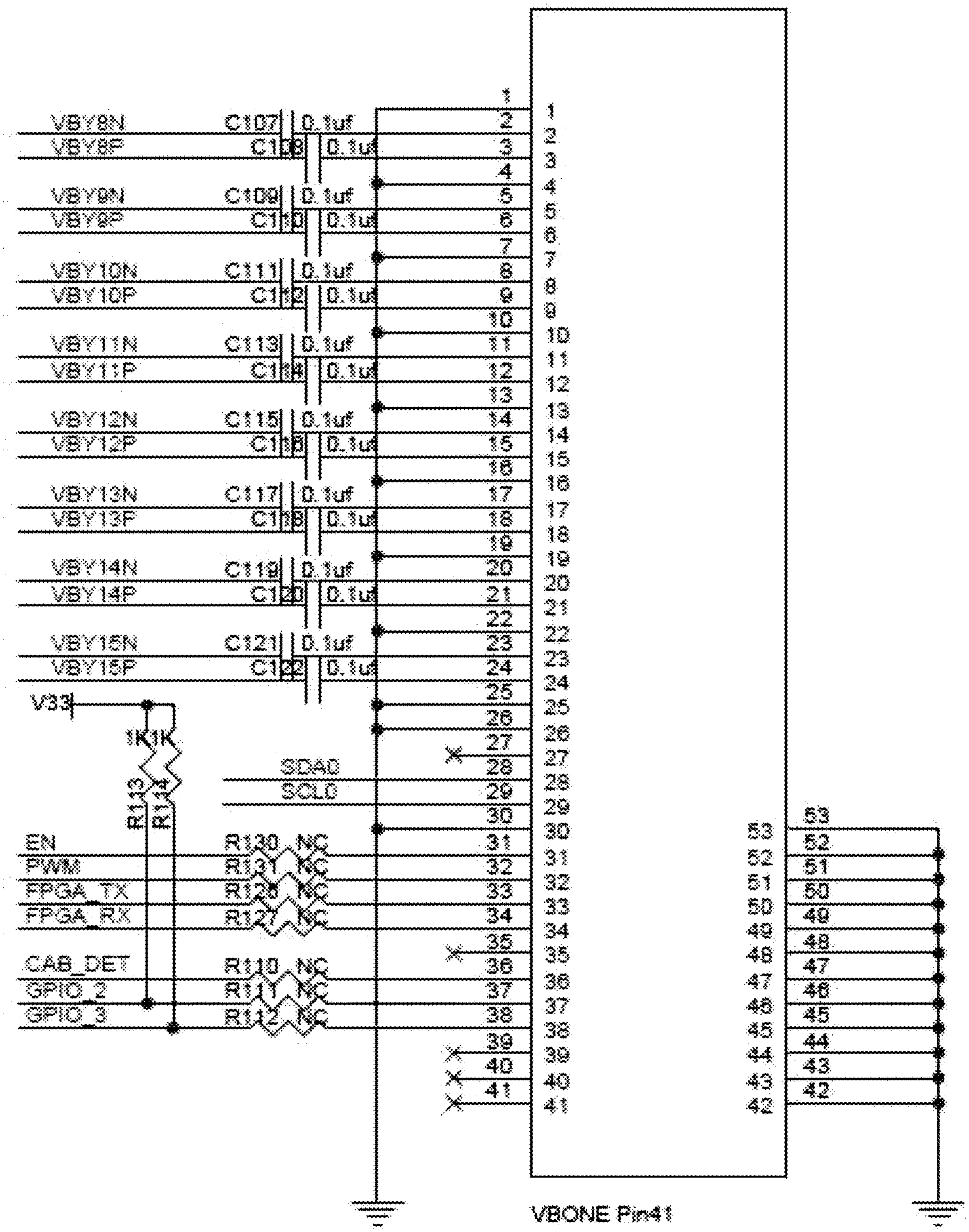
FIG. 6 is a signal connection schematic diagram of a 41-pin sub-connector according to an embodiment of the present disclosure.

FIG. 6 is a signal connection diagram of a 41-pin sub-connector according to an embodiment of the present disclosure. As shown in FIG. 6, the 41-pin sub-connector can be configured to transmit the second sub-data signal VB2, the second display control signal D2 and the detection level signal $V_{CAB\_DET}$. The second sub-data signal VB2 may include multiple pairs of differential voltage difference signals. The 2nd to 3rd pins, the 5th to 6th pins, the 8th to 9th pins, the 11th to 12th pins, the 14th to 15th pins, the 17th to 18th pins, the 20th to 21th pins, and 23th to 24th pins of the 41-pin sub-connector can be configured to transmit the second sub-data signal VB2. The second display control signal D2 can at least be configured to adjust the backlight parameters of the display module. The 28th to 29th pins, the 31st to 34th pins, and the 37th to 38th pins of the 41-pin sub-connector transmit the second display control signal D2. The 36th pin of the 41-pin sub-connector can be configured to transmit the detection level signal $V_{CAB\_DET}$. In addition, the 1st, 4th, 7th, 10th, 13th, 16th, 19th, 22nd, 25th and 30th pins of the 41-pin sub-connector are ground pins.

Table 2 is a description of the signals connected to each pin in the 41-pin sub-connector. It can be seen from Table 2 that the second sub-data signal VB2 transmitted in the 41-pin sub-connector can include 8 pairs of high-speed signals: (TX8N, TX8P), (TX9N, TX9P), (TX10N, TX10P), (TX11N, TX11P), (TX12N, TX12P), (TX13N, TX13P), (TX14N, TX14P), (TX15N, TX15P). The high-speed signal is a differential voltage difference signal and can be transmitted at a rate of several hundred Mbit/s. The second sub-data signal VB2 transmits the display data of the panel through individual channels in an AC coupling manner. The second display control signal D2 transmitted in the 41-pin sub-connector may include a second communication signal, a backlight control signal, a backlight adjustment signal and an asynchronous communication signal, and may specifically include 6 low-speed signals: SDA_G, SCL_G, BL, ADJ, TX, RX. Among them, SDA_G, SCL_G are the second communication signals, specifically a group of IIC signals, which are reserved for the communication between the main board at the signal source end and the TCON board at the display end, and can be configured to adjust the display parameters of other types of the display module. The second communication signal and the first communication signal described in the present disclosure can both be configured to adjust the display parameters of the display module, and the two can be configured to adjust the display parameters of different types. BL is a backlight control signal, which only outputs high and low levels. For example, when BL outputs a high level, the backlight is turned on, and when BL outputs a low level, the backlight is turned off. ADJ is a backlight adjustment signal to adjust the backlight brightness, and the backlight brightness frequency can be controlled at about 200 Hz. ADJ can be a PWM signal, and the brightness is related to the duty cycle of the ADJ signal. The higher the duty cycle, the higher the backlight brightness, and the lower the duty cycle, the lower the backlight brightness. The UART_TX signal and the UART_RX signal are asynchronous communication signals, which are reserved for the mainboard to communicate with asynchronous communication devices (such as FPGA, camera, etc.), and can be configured to adjust screen display parameters, backlight parameters, sound parameters, etc. The asynchronous communication signal included in the second display control signal described in the present disclosure can be a UART_TX signal or a UART_RX signal. For example, the first control circuit communicates with the asynchronous communication device of the display end by sending the UART_TX signal, and the UART_RX signal is the signal fed back by the asynchronous communication device of the display end to the first control circuit.

In other embodiments, the first control circuit can also output GPIO2 signal and GPIO3 signal to the first signal transmission module. The GPIO2 signal and GPIO3 signal are power control signals. For example, when the power control signal is at a high level, the 12V power supply can be turned on. The GPIO2 signal can be configured to control the 12V power supply of the screen, and the GPIO3 signal can be configured to control the 12V power supply other than the screen. For example, the signal source end may include a switch control circuit, and the switch control circuit may be arranged on the same circuit board as the first signal transmission module. The first control circuit may control the switch control circuit by outputting a GPIO2 signal to control the output of the third power supply signal V3, and/or, control the switch control circuit by outputting a GPIO3 signal to control the output of the fourth power supply signal V4. The control principle of the GPIO2 signal and the GPIO3 signal may be referred to the introduction of the subsequent embodiments.

In addition, the first signal transmission module may also transmit the detection level signal $V_{CAB\_DET}$ to the first control circuit 11 through the 41-pin sub-connector. The detection level signal $V_{CAB\_DET}$ may be a high or low level signal, which is configured to determine whether the display end 2 is connected to the signal source end 1. For example, when the display end 2 is connected to the signal source end 1, CAB_DET may output a low level signal, and when the display end 2 is not connected to the signal source end 1, CAB_DET may output a high level signal.

TABLE 2

| Pin No | Name | Description |
|---|---|---|
| 1 | GND | Ground |
| 2 | TX8N | Negative VbyOne differential data output |
| 3 | TX8P | Positive VbyOne differential data output |
| 4 | GND | Ground |
| 5 | TX9N | Negative VbyOne differential data output |
| 6 | TX9P | Positive VbyOne differential data output |
| 7 | GND | Ground |
| 8 | TX10N | Negative VbyOne differential data output |
| 9 | TX10P | Positive VbyOne differential data output |
| 10 | GND | Ground |
| 11 | TX11N | Negative VbyOne differential data output |
| 12 | TX11P | Positive VbyOne differential data output |
| 13 | GND | Ground |
| 14 | TX12N | Negative VbyOne differential data output |
| 15 | TX12P | Positive VbyOne differential data output |
| 16 | GND | Ground |
| 17 | TX13N | Negative VbyOne differential data output |
| 18 | TX13P | Positive VbyOne differential data output |
| 19 | GND | Ground |
| 20 | TX14N | Negative VbyOne differential data output |
| 21 | TX14P | Positive VbyOne differential data output |
| 22 | GND | Ground |
| 23 | TX15N | Negative VbyOne differential data output |
| 24 | TX15P | Positive VbyOne differential data output |
| 25 | GND | Ground |
| 26 | NC | No Connection |
| 27 | NC | No Connection |
| 28 | SDA_G | SDA_G |
| 29 | SCL_G | SCL_G |
| 30 | GND | Ground |
| 31 | BL | LED ON signal |
| 32 | ADJ | LED PWM DIM |
| 33 | TX | UART_TX |
| 34 | RX | UART_RX |
| 35 | NC | No Connection |
| 36 | CAB_DET | Cable Plug Detect |
| 37 | GPIO2 | GPIO2 |
| 38 | GPIO3 | GPIO3 |

TABLE 2-continued

| Pin No | Name | Description |
|---|---|---|
| 39 | NC | No Connection |
| 40 | NC | No Connection |
| 41 | NC | No Connection |

The hot-plug function of the power interface of the display device of the present disclosure is described below. The display device may include a plurality of switch modules. The switch module may be arranged on the same circuit board as the first signal transmission module 12, and the switch module may control whether the connected voltage output end outputs a voltage signal according to the detection level signal $V_{CAB\_DET}$. As shown in FIG. 1, in an exemplary embodiment, the signal source end may also include a switch control circuit 14. The switch control circuit 14 may be arranged on the same circuit board as the first signal transmission module 12. The switch control circuit 14 may be connected to the first control circuit 11 to control the output of the first voltage signal V1, the third voltage signal V3 and the fourth voltage signal V4 of the signal source end under the control of the first control circuit 11. Generally, there are many devices on the first control circuit (mainboard) and the wiring is complicated. The present disclosure arranges the switch control circuit 14 and the first signal transmission module 12 on the same circuit board, so that there is no need to modify the first control circuit 11 (mainboard), which can greatly reduce the workload. The switch control circuit 14 may include, for example, a first switch module, a second switch module and a third switch module. The first switch module may be configured to control the output of the first power supply signal V1, the second switch module may be configured to specifically control the output of the third power supply signal V3, and the third switch module may be configured to specifically control the output of the fourth power supply signal V4. The first control circuit 11 may output the third power supply signal V3 and the fourth power supply signal V4. The third power supply signal V3 and the fourth power supply signal V4 are output to the corresponding switch modules, and the outputs of the third power supply signal V3 and the fourth power supply signal V4 are controlled by the voltage output ends of the corresponding switch modules. Of course, in other embodiments, the switch control circuit 14 may also be arranged on the same circuit board as the first control circuit 11, which all belong to the protection scope of the present disclosure.

Figure 7:
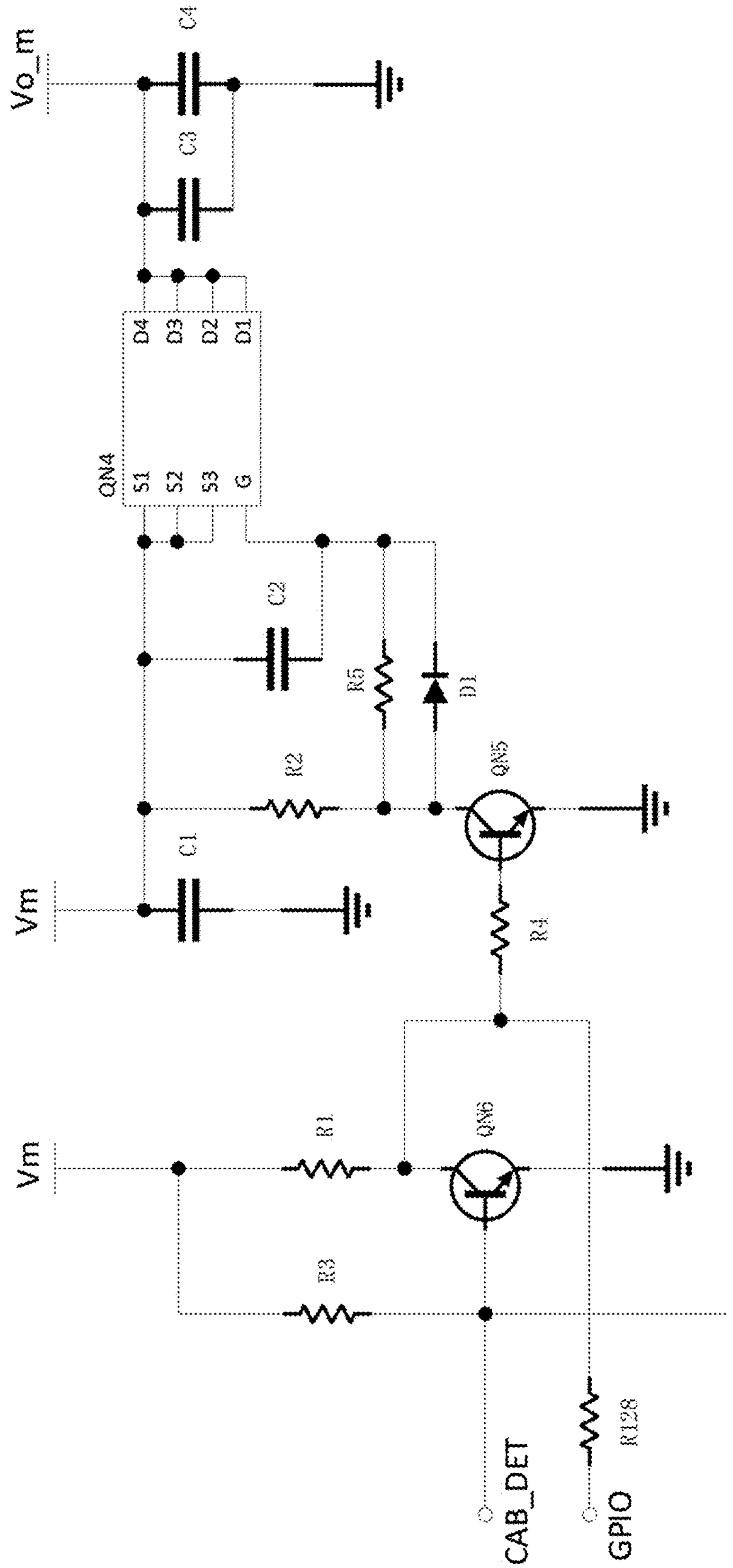
FIG. 7 is a structural schematic diagram of a switch module according to an embodiment of the present disclosure.

FIG. 7 is a structural schematic diagram of a switch module according to an embodiment of the present disclosure. As shown in FIG. 7, the switch module may include a first switch unit QN6, a second switch unit QN5 and a third switch unit QN4. The control terminal of the first switch unit QN6 is connected to the detection level signal $V_{CAB\_DET}$, the first terminal of the first switch unit QN6 is connected to the power supply signal Vm to be output through a voltage divider circuit, and the second terminal of the first switch unit QN6 is grounded. The control terminal of the second switch unit QN5 is connected to the first terminal of the first switch unit QN6, the first terminal of the second switch unit QN5 is connected to the power supply signal Vm to be output through another voltage divider circuit, and the second terminal of the second switch unit QN5 is grounded. The control terminal of the third switch unit QN4 is connected to the first terminal of the second switch unit QN5, the first terminal of the third switch unit QN4 is connected to the power supply signal Vm to be output, and the second terminal of the third switch unit QN4 is connected to the voltage output end for outputting power supply signal.

For example, when the detection level signal $V_{CAB\_DET}$ is at a low level, the first switch unit QN6 is turned on, so that the control terminal of the second switch unit QN5 is at a low level; the second switch unit QN5 is turned on, so that the control terminal of the third switch unit QN4 is at a low level; and the third switch unit QN4 is turned on, and the power supply signal is output through the voltage output end. On the contrary, when the detection level is at a high level, the first switch unit QN6 is turned off, so that the control terminal of the second switch unit QN5 is at a high level; the second switch unit QN5 is turned off, so that the control terminal of the third switch unit QN4 is at a high level; and the third switch unit QN4 is turned off, thereby controlling the voltage output end to stop outputting the power supply signal.

In an exemplary embodiment, the first switch unit QN6 and the second switch unit QN5 may be P-type transistors. The third switch unit QN4 may include a PMOS transistor. The voltage divider circuit may be a resistor voltage divider circuit. The voltage divider circuit connected to the first terminal of the first switch unit QN6 may include a first resistor R1. One terminal of the first resistor R1 is connected to the power supply signal Vm to be output, and the other terminal is connected to the first terminal of the first switch unit QN6. The voltage divider circuit connected to the first terminal of the second switch unit QN5 may include a second resistor R2. A first terminal of the second resistor R2 is connected to the power supply signal Vm to be output, and a second terminal is connected to the first terminal of the second switch unit QN5. The resistance value in the resistor voltage divider circuit can be determined according to the parameters of the transistor. In addition, since the third switch unit QN4 needs to output a power supply voltage, a filter capacitor can be set at the first terminal and the second terminal of the third switch unit QN4. The filter capacitor may specifically include a first capacitor C1, a third capacitor C3 and a fourth capacitor C4. The first terminal of the first capacitor C1 is connected between the first terminal of the third switch unit QN4 and the power supply signal Vm to be output, and the second terminal of the first capacitor C1 is grounded. The third capacitor C3 and the fourth capacitor C4 are connected in parallel and one terminal is connected between the second terminal of the third switch unit QN4 and the voltage output end, and the other end is grounded. By setting the filter capacitor, interference signals can be filtered out and stable voltage signals can be output. In addition, the switch module may also include a third resistor R3, a fourth resistor R4, a start-up slow start module and a shutdown discharge module. One terminal of the third resistor R3 is connected to the power supply signal Vm to be output, and the other terminal is connected to the control terminal of the first switch unit QN6. One terminal of the fourth resistor R4 is connected between the first terminal of the first switch unit QN6 and the corresponding voltage divider circuit, and the second terminal of the fourth resistor R4 is connected to the control terminal of the second switch unit QN5. The start-up slow start module may include a second capacitor C2 and a fifth resistor R5. The first terminal of the second capacitor C2 is connected to the first terminal of the first capacitor C1, the second terminal of the second capacitor C2 is connected to the control terminal of the third switch unit QN4. One terminal of the fifth resistor R5 is connected between the first terminal of the second switch transistor and the corresponding voltage divider circuit, and the other terminal of the fifth resistor R5 is connected to the control terminal of the third switch transistor. The shutdown discharge module may include a diode D1. The anode of the diode D1 is connected between the first terminal of the second switch transistor and the corresponding voltage divider circuit, and the cathode of the diode D1 is connected to the control terminal of the third switch transistor. It should be understood that in other exemplary embodiments of the present disclosure, the switch module may also have other structures.

Figure 8:
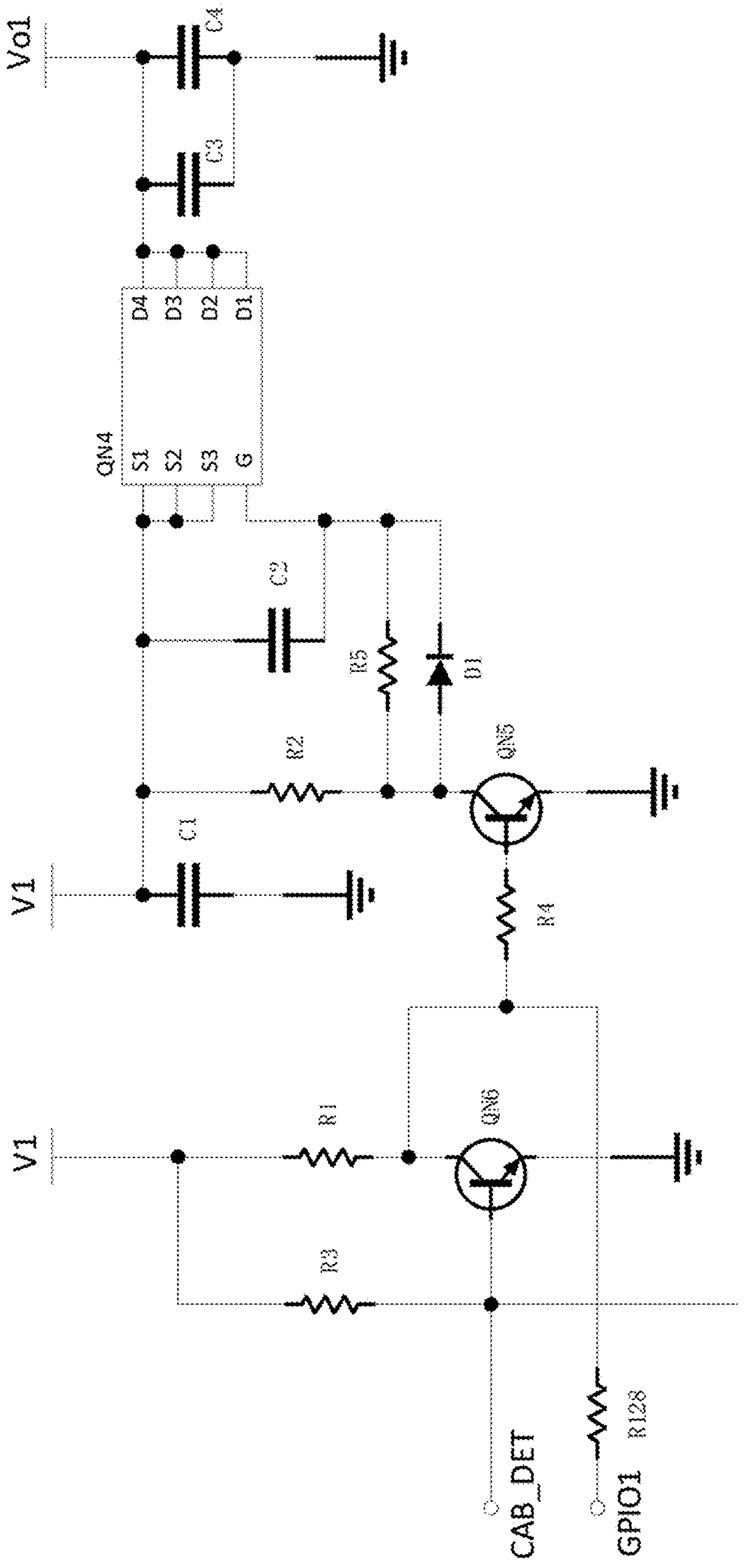
FIG. 8 is a structural schematic diagram of a first switch module according to an embodiment of the present disclosure.
Figure 9:
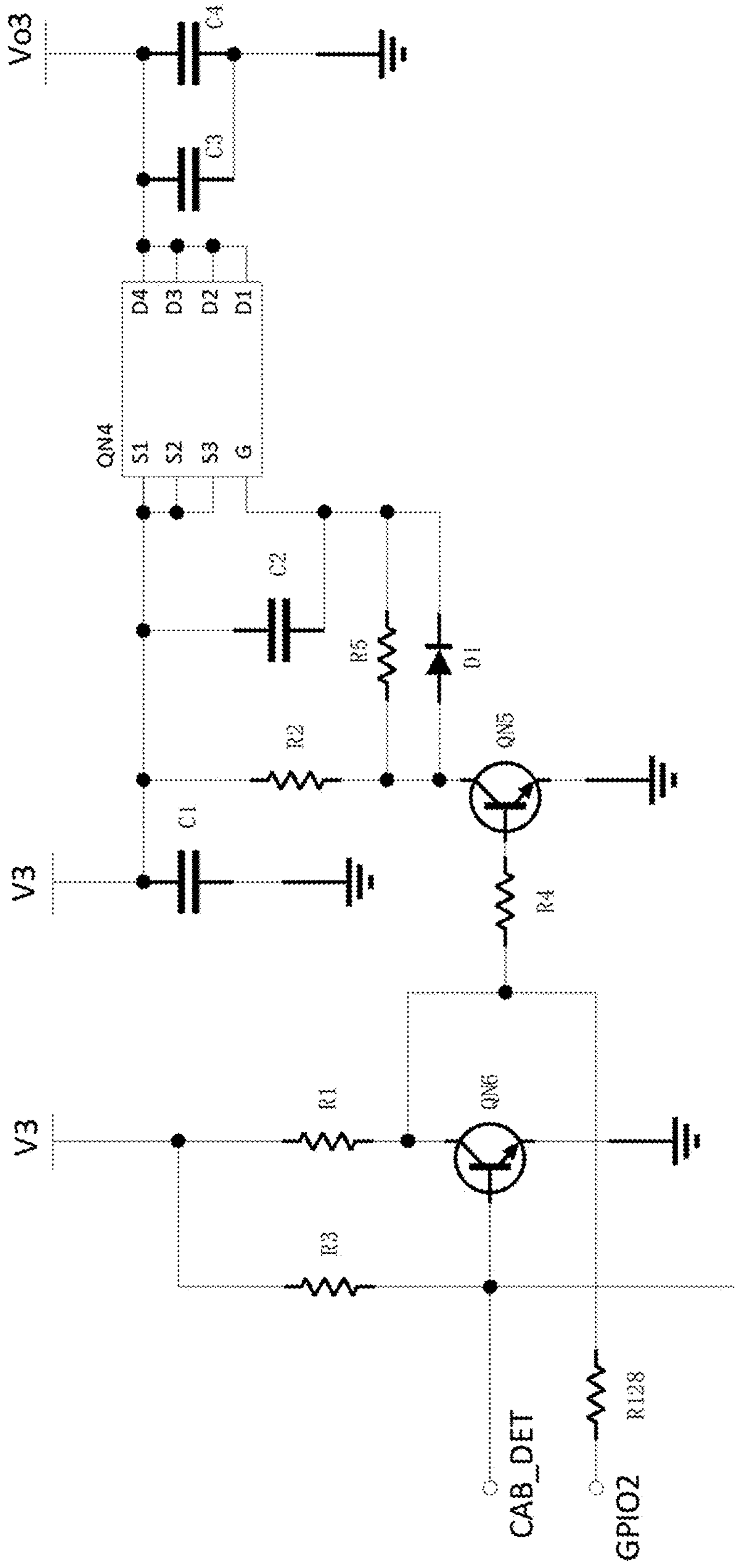
FIG. 9 is a structural schematic diagram of a second switch module according to an embodiment of the present disclosure.
Figure 10:
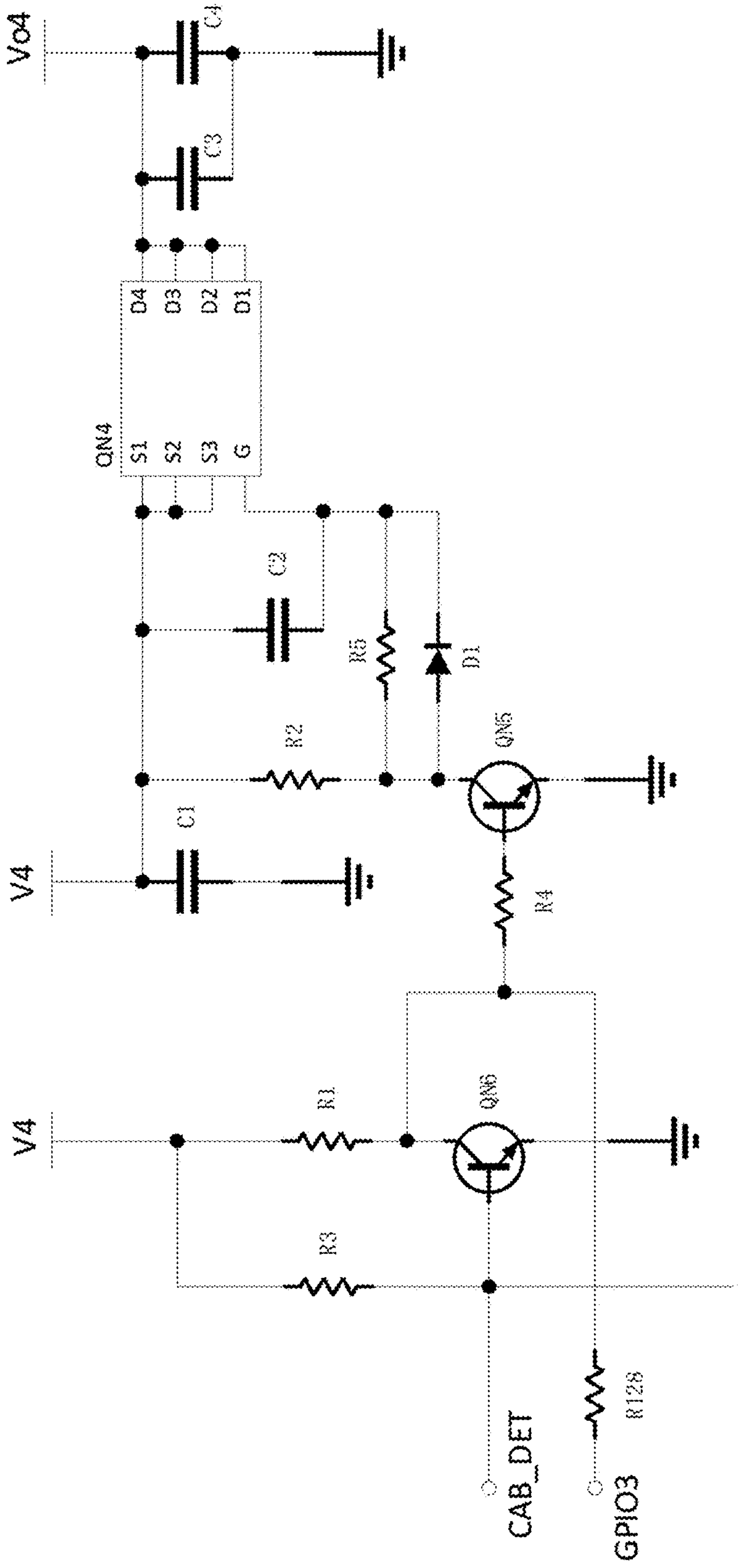
FIG. 10 is a structural schematic diagram of a third switch module according to an embodiment of the present disclosure.

On this basis, the output of respective voltage output terminals can be correspondingly controlled by setting multiple switch modules. For example, the present disclosure may include a first switch module, a second switch module, and a third switch module. The first switch module, the second switch module, and the third switch module may be located on the same circuit board as the first signal transmission module 12. As shown in FIG. 8, the first terminal of the first switch unit QN6 in the first switch module is connected to the first power supply signal V1 through a voltage divider circuit. The first terminal of the second switch unit QN5 is connected to the first power supply signal V1 through another voltage divider circuit. The first terminal of the third switch unit QN4 is connected to the first power supply signal V1. The second terminal of the third switch unit QN4 is connected to the first voltage output terminal Vo1. The first switch module may control the output of the first voltage output terminal Vo1. When the detection level signal $V_{CAB\_DET}$ is at a low level, the first switch module may control the first voltage output terminal Vo1 to output the first power supply signal V1, and when the detection level signal $V_{CAB\_DET}$ is at a high level, the first switch module may control the first voltage output terminal Vo1 to stop outputting the first power supply signal V1. The second switch module can control the third voltage output terminal Vo3 to output or stop outputting the third power supply signal V3, and the circuit structure of the second switch module is shown in FIG. 9. The third switch module can control the fourth voltage output terminal Vo4 to output or stop outputting the fourth power supply signal V4, and the circuit structure of the third switch module is shown in FIG. 10. The working principles of the second switch module and the third switch module are similar to that of the first switch module, and will not be repeated here.

In an exemplary embodiment, in a case where the third power supply signal V3 and the fourth power supply signal V4 output by the signal source end are configured to power the display unit and the photoelectric converter of the display end, the first connector may include one or more first pins to fourth pins, depending on the number of power lines to be connected. For example, the first connector may include two first pins, two third pins, two fourth pins and one second pin. The third connector connected to the first connector may include two thirty-first pins, one thirty-second pin, two thirty-third pins and two thirty-fourth pins. The first pin is connected to the thirty-first pin, and the thirty-first pin is connected to the first power line in the transmission part 3 for transmitting the first power supply signal V1. The third pin is connected to the thirty-third pin. The thirty-third pin is connected to the third power line in the transmission part 3, and is configured to transmit the third power supply signal V3. The fourth pin is connected to the thirty-fourth pin. The thirty-fourth pin is connected to the fourth power line in the transmission part 3, and is configured to transmit the fourth power supply signal V4. The second pin is connected to the third-second pin. The thirty-second pin is connected to the second power line in the transmission part 3, and is configured to transmit the detection level signal $V_{CAB\_DET}$.

Figure 11:
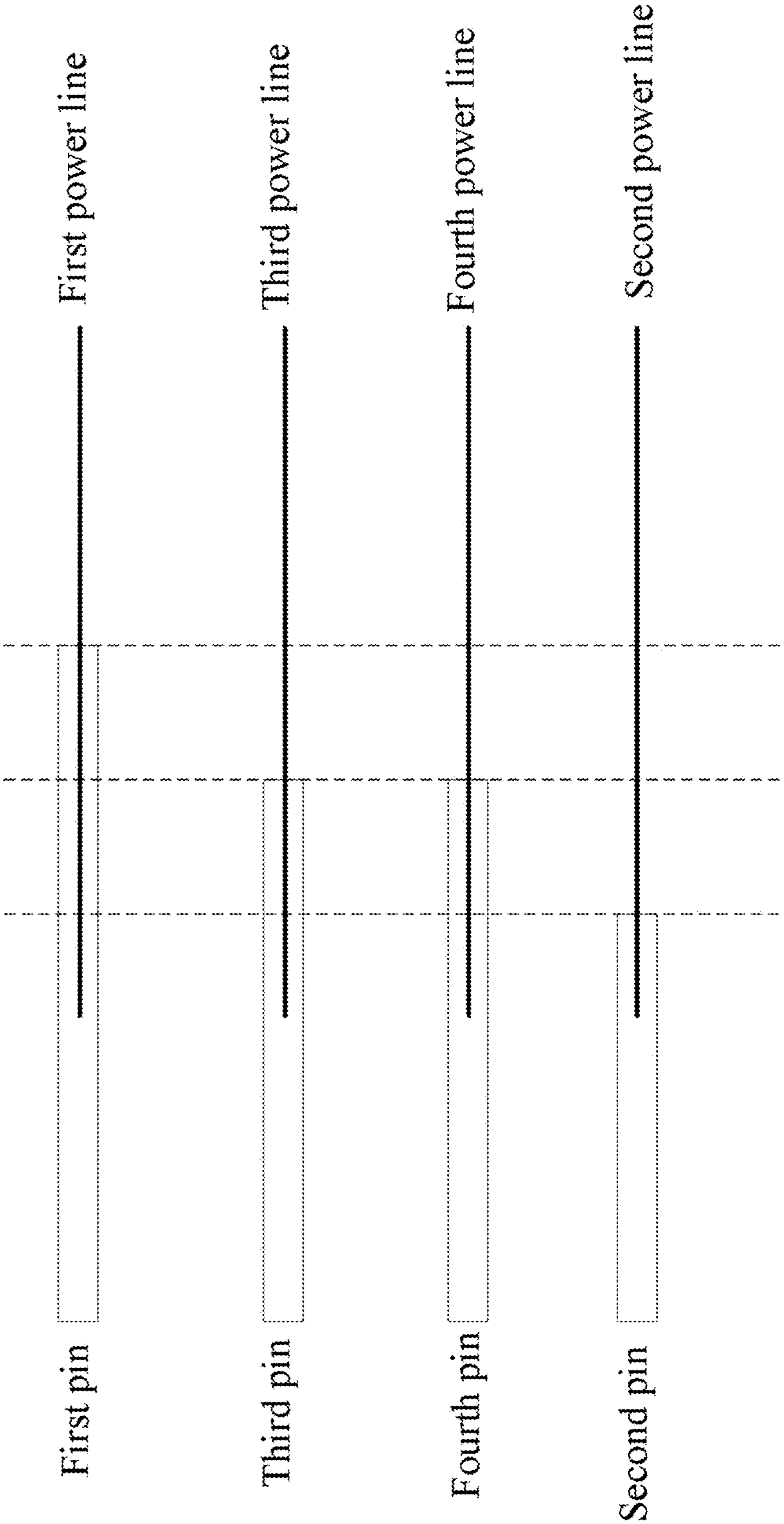
FIG. 11 is a structural schematic diagram of different pins according to an embodiment of the present disclosure.
Figure 12:
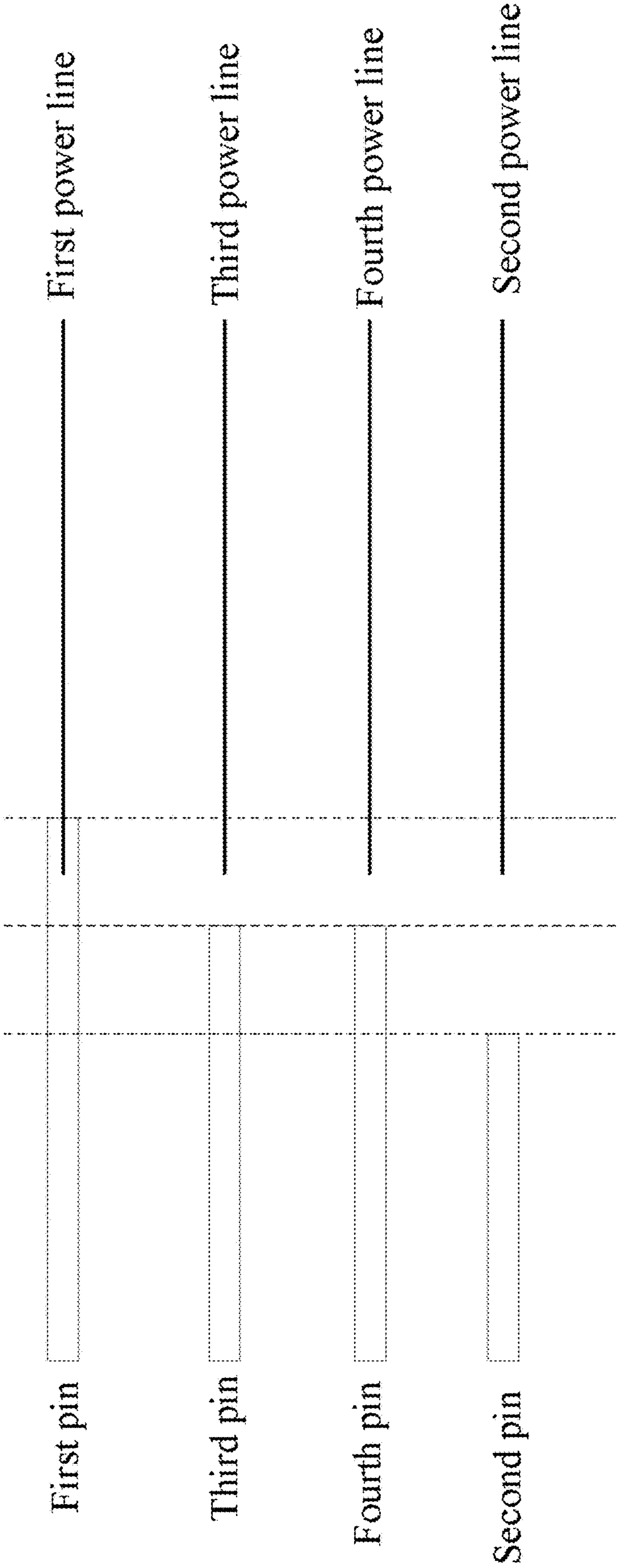
FIG. 12 is a schematic diagram of a state of different pins according to an embodiment of the present disclosure.
Figure 13:
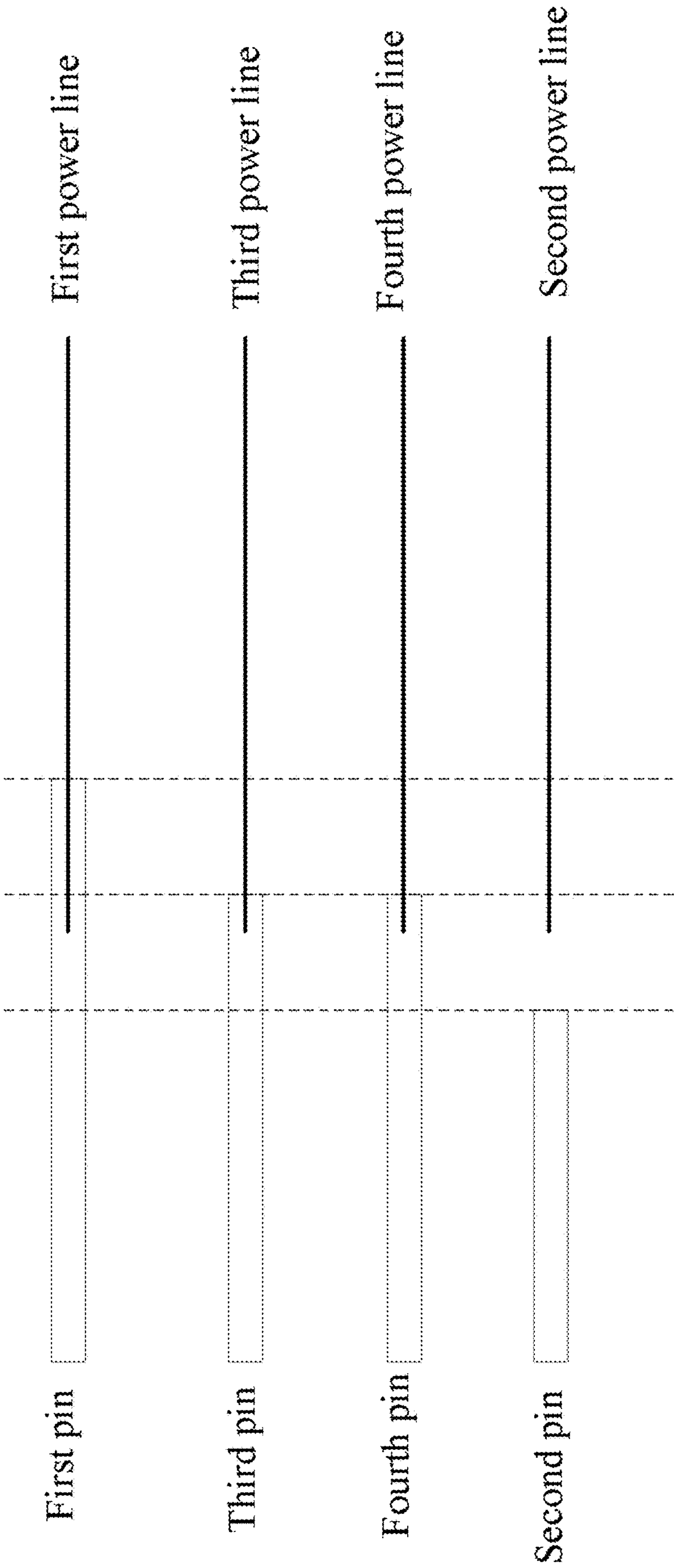
FIG. 13 is a schematic diagram of another state of different pins according to an embodiment of the present disclosure.

FIG. 11 is a structural schematic diagram of different pins according to an embodiment of the present disclosure. The pin lengths of the 31st pin, the 32nd pin, the 33rd pin and the 34th pin of the third connector can be set to be the same. The pin length of the 4th pin in the first connector is set to be the same as the pin length of the 3rd pin. The pin lengths of the first pin, the third pin and the second pin decrease in sequence. Or, the pin lengths of the first pin, the second pin, the third pin and the fourth pin in the first connector are set to be the same. The pin length of the 34th pin in the third connector is set to be the same as the pin length of the 33rd pin. The pin lengths of the 31st pin, the 33rd pin and the 32nd pin decrease in sequence, so as to realize hot plug detection of the display device on the display end. The following is only an example of setting the pin lengths of pins connected to the power line in the third connector to be the same, setting the pin length of the 4th pin in the first connector to be the same as the pin length of the 3rd pin, and reducing the pin lengths of the first pin, the third pin and the second pin in sequence. During the process of inserting the transmission part 3 into the signal source end 1, as shown in FIG. 12, the 31st pin of the transmission part 3 connected to the first power line will first contact the first pin, and at this time, the second pin for transmitting the detection level signal $V_{CAB\_DET}$ does not contact the 32nd pin of the transmission part 3 connected to the second power line, so the switch module will not operate. As the transmission part 3 continues to be inserted, as shown in FIG. 13, the 33rd pin of the transmission part 3 contacts the 3rd pin, and at this time, the second pin for transmitting the detection level signal $V_{CAB\_DET}$ still does not contact the 32nd pin of the transmission part 3 connected to the second power line, so the switch module still does not operate. As the transmission part 3 continues to be inserted, as shown in FIG. 11, the second pin for transmitting the detection level signal $V_{CAB\_DET}$ contacts the 32nd pin of the transmission part 3 connected to the second power line. At this time, the detection level signal $V_{CAB\_DET}$ IS pulled low. The switch module detects that the detection level signal $V_{CAB\_DET}$ is pulled low and starts to act. That is, the first switch module controls the first voltage output terminal Vo1 to output the first power supply signal V1, the second switch module controls the third voltage output terminal Vo3 to output the third power supply signal V3, and the third switch module controls the fourth voltage output terminal Vo4 to output the fourth power supply signal V4. The process of the transmission part 3 pulling out the signal source end 1 is just the opposite of the above process. When the second pin for transmitting the detection level signal $V_{CAB\_DET}$ is separated from the transmission part 3, the first switch module controls the first voltage output terminal Vo1 to stop outputting the first power supply signal V1, the second switch module controls the third voltage output terminal Vo3 to stop outputting the third power supply signal V3, and the third switch module controls the fourth voltage output terminal Vo4 to stop outputting the fourth power supply signal V4. The advantage of such a setting is that, during the insertion process of the transmission part 3, since no power supply signal is output when the first power line of the transmission part 3 contacts the first pin, during the pull-out process of the transmission part 3, the first power line of the transmission part 3 is powered off before being separated from the first pin, that is, there is no power-on or power-off signal at the moment when the first power line of the transmission part 3 contacts or separates from the first pin, so it will not cause sparks. The fourth power line and the third power line have the same working principle during the plugging and unplugging process, so the display device provided by the present disclosure can realize hot plug of the interface, which can avoid sparks and protect the power supply safety of the display device. In the exemplary embodiment, high voltages of 220V to 400V and low voltages of 5V to 12V can be simultaneously transmitted through the interface of the signal transmission module. Compared with the traditional interface, this exemplary embodiment sets contacts of different lengths for different signals. When the mainboard (first control circuit) detects that the detection pin is fully connected, the mainboard will control the switch module or relay on the power board to output 220V and 12V respectively. Otherwise, the output will be stopped if the interface is loose, disconnected, or unplugged. In this way, hot plug detection of the interface can be realized to avoid sparks and play a role in power safety protection for the entire system. It should be understood that in the exemplary embodiment, in a case where the step-down unit of the display end outputs the third power supply signal V3 and the fourth power supply signal V4 to power the display unit and the photoelectric converter of the display end, the first connector can include only two first pins and one second pin. Similarly, by setting the pin length of the first pin to be longer than the pin length of the second pin, the first control circuit can also realize the hot plug detection function of the interface that transmits the first power supply signal V1.

In addition, it should be understood that, based on the same principle, the display device can also implement a hot plug detection function on the display end. The second connector of the display end is connected to the fourth connector of the transmission part 3. The second connector may include a twenty-first pin, a twenty-second pin, a twenty-third pin, and a twenty-fourth pin. The fourth connector may include a forty-first pin, a forty-second pin, a forty-third pin, and a forty-fourth pin. The forty-first pin is connected to the twenty-first pin, the forty-second pin is connected to the twenty-second pin, the forty-third pin is connected to the twenty-third pin, and the forty-fourth pin is connected to the twenty-fourth pin. The pin lengths of the forty-first pin, the forty-second pin, the forty-third pin, and the forty-fourth pin in the fourth connector may be set to be the same, and the pin length of the twenty-third pin in the second connector is set to be the same as the pin length of the twenty-fourth pin, and the pin lengths of the twenty-first pin, the twenty-third pin, and the twenty-second pin are set to decrease in sequence. Or, the pin lengths of the twenty-first pin, the twenty-second pin, the twenty-third pin, and the twenty-fourth pin in the second connector are set to be the same, the pin length of the forty-third pin in the fourth connector is set to be the same as the pin length of the forty-fourth pin, and the pin lengths of the forty-first pin, the forty-third pin, and the forty-second pin are set to decrease in sequence, thereby realizing the hot plug detection function of the display device on the display end. The principle of hot plug detection is the same as the hot plug detection principle at the signal source end mentioned above, and will not be repeated here.

It should be understood that, for the display device, the first connector and the third connector, the second connector and the fourth connector can simultaneously have the hot-plug function of the power interface, so that no matter whether the signal source end or the display end is connected or separated first, the display device can realize the hot-plug detection function. Of course, in other exemplary embodiments of the present disclosure, the hot-plug function of the power interface can also be provided only at the signal source end, or only at the display end, and these all belong to the protection scope of the present disclosure.

In an exemplary embodiment, the first control circuit 11 can also include a first power control terminal, a second power control terminal and a third power control terminal. The first control circuit 11 can output a first power control signal GPIO1 through the first power control terminal, and control the output state of the first voltage output terminal Vo1 based on the above-mentioned switch module; output a second power control signal GPIO2 through the second power control terminal to control the output state of the third voltage output terminal; and output a third power control signal GPIO3 through the third power control terminal to control the output state of the fourth voltage output terminal. The first power control terminal, the second power control terminal and the third power control terminal can be general input and output ports GPIO, and the first control circuit outputs corresponding power control signals through different general input and output ports GPIO. The control principles of the output states of respective voltage output terminals by the first control circuit 11 are similar. The following is only an example of the first control circuit 11 controlling the output state of the third voltage output terminal through the second power control terminal.

As shown in FIG. 9, in an exemplary embodiment, the second power control terminal is connected to the first terminal of QN5 in the second switch module. The second power control signal GPIO2 output by the second power control terminal can directly control QN5 to turn on or off, so that the first control circuit 11 can actively control the third voltage output terminal to output 12V to power the display screen or stop outputting 12V to turn off the display screen through the second power control signal GPIO2 output by the second power control terminal. For example, Table 3 is the logical relationship of the power control circuit provided in this exemplary embodiment.

TABLE 3

| Signal | CAB_DET | GPIO_2 | Output 12 V |
|---|---|---|---|
| State 1 | — | — | Low |
| State 2 | Low | Low | Low |
| State 3 | Low | High | High |

As shown in Table 3, when the second power control signal GPIO2 output by the first control circuit 11 is at a high level, the control terminal of the second switch unit QN5 in the second switch module is at a high level, and the second switch unit QN5 is turned off, so that the control terminal of the third switch unit QN4 is at a high level, and the third switch unit QN4 is turned off, thereby controlling the third voltage output terminal to stop outputting the third power supply signal V3. When the second power control signal GPIO2 output by the first control circuit 11 is at a low level, the control terminal of the second switch unit QN5 in the second switch module is at a low level, and the second switch unit QN5 is turned on, so that the control terminal of the third switch unit QN4 is at a low level, and the third switch unit QN4 is turned on, thereby controlling the third voltage output terminal to output the third power supply signal V3. As shown in FIG. 10, the first control circuit 11 can also actively control the fourth voltage output terminal to output 12V to power the photoelectric conversion module or stop outputting 12V to stop powering the photoelectric conversion module by the third power control signal GPIO3 output by the third power control terminal. As shown in FIG. 8, the first control circuit 11 can also actively control whether the first voltage output terminal Vo1 outputs the first power supply signal V1 by the first power supply control signal GPIO1 output by the first power control terminal. The first power supply control signal GPIO1 can be output to the corresponding switch module through the pins reserved in the 41-pin sub-connector or output to the corresponding switch module through other sub-connectors other than the 51-pin sub-connector and the 41-pin sub-connector. It can be understood that the first control circuit (mainboard) can actively control whether the second switch module outputs the third power supply signal V3 for powering the display unit by outputting the second power supply control signal GPIO2, and actively control whether the third switch module outputs the fourth power supply signal V4 for powering the photoelectric conversion module by outputting the third power supply control signal GPIO3.

The first signal transmission module 12 of the display end 2 of the present disclosure may include multiple photoelectric converters, and the specific number of photoelectric converters may be determined according to the resolution of the display device. In an exemplary embodiment of the present disclosure, at the signal source end 1, an optoelectronic unit may include two 4-channel vertical cavity surface emitting laser (VCSEL) driving array chips and 8 lasers, which can convert 8 pairs of electrical signals into optical signals and transmit them using optical fibers. That is, one optoelectronic unit can transmit 8 pairs of optical signals. It should be understood that in other exemplary embodiments of the present disclosure, one optoelectronic unit can also transmit other numbers of pairs of optical signals.

Figure 14:
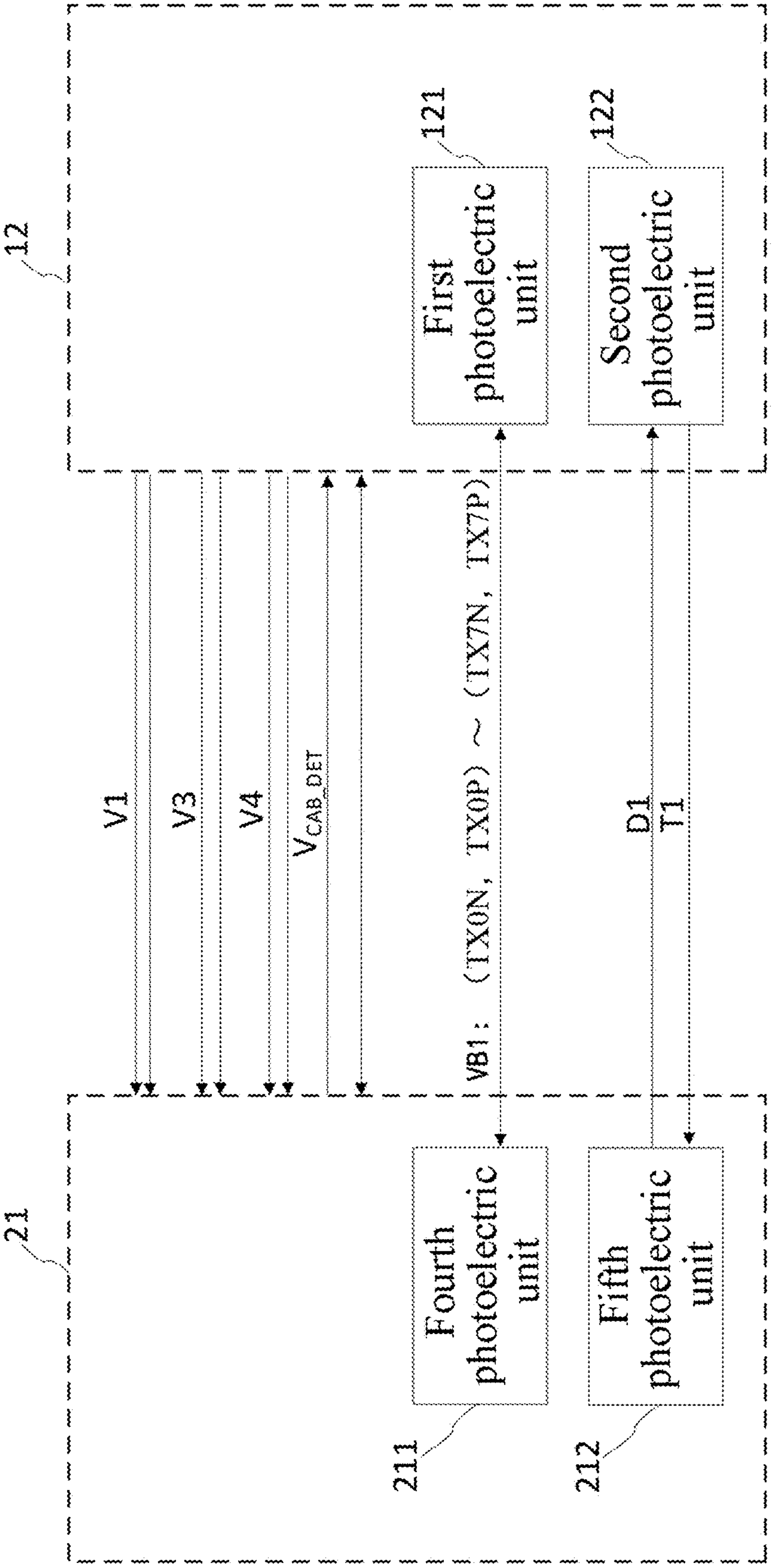
FIG. 14 is a structural schematic diagram of a signal transmission module according to an embodiment of the present disclosure.

FIG. 14 is a structural schematic diagram of a signal transmission module according to an embodiment of the present disclosure. In an exemplary embodiment of the present disclosure, for example, for a UHD 60 Hz TV panel, a V BY ONE data signal may include a first sub-data signal VB1, which is a high-speed signal. A low-speed signal may also be transmitted between the second signal transmission module and the first signal transmission module. The low-speed signal may include a first display control signal D1 and a first communication signal T1. The first display control signal D1 is transmitted from the second signal transmission module to the first signal transmission module, and the first communication signal T1 is transmitted from the first signal transmission module to the second signal transmission module. Correspondingly, the first signal transmission module 12 may include a first photoelectric unit 121 and a second photoelectric unit 122. The first sub-data signal VB1 is a high-speed signal and may include 8 pairs of differential voltage difference signals. The first sub-data signal VB1 is distributed to the first photoelectric unit 121, and the first photoelectric unit 121 converts the electrical signal into an optical signal for transmission. The first display control signal D1 and the first communication signal T1 are low-speed signals. The first display control signal D1 and the first communication signal T1 are packaged into the second photoelectric unit 122, and the second photoelectric unit 122 converts the optical signal corresponding to the first display control signal D1 into an electrical signal and outputs it to the first control circuit 11, and converts the first communication signal T1 into an optical signal for transmission. At the display end 2, similar circuits and modules are used to convert the optical signal into an electrical signal to drive the LCD module. Specifically, the second signal transmission module of the display end 2 may include a fourth photoelectric unit 211 and a fifth photoelectric unit 212. The fourth photoelectric unit 211 communicates with the first photoelectric unit 121 of the signal source end 1, and the fifth photoelectric unit 212 communicates with the second photoelectric unit 122 of the signal source end 1. The fourth photoelectric unit 211 is configured to convert the optical signal transmitted by the first photoelectric unit 121 into the first sub-data signal VB1. The fifth photoelectric unit 212 can convert the first display control signal D1 into an optical signal and transmit it to the second photoelectric unit 122, and convert the optical signal corresponding to the first communication signal T1 into an electrical signal for output. The first display control signal D1 is configured to instruct the first control circuit 11 to output the first sub-data signal VB1. The transmission part 3 may include a plurality of first sub-optical fibers and a plurality of second sub-optical fibers. The first sub-optical fiber is configured to transmit the optical signal corresponding to the first sub-data signal VB1, and the second sub-optical fiber is configured to transmit the optical signal corresponding to the first display control signal D1.

Figure 15:
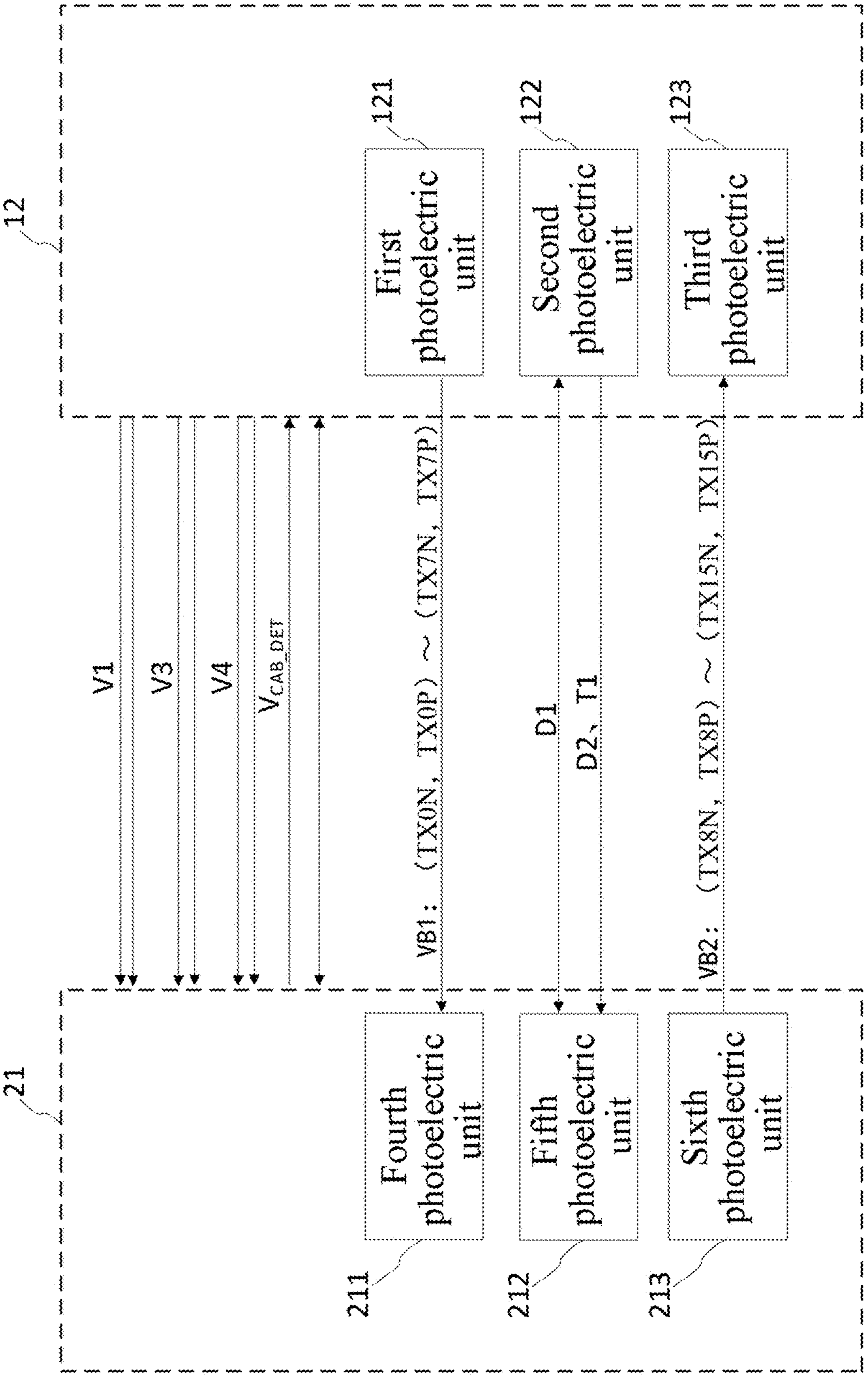
FIG. 15 is a structural schematic diagram of a signal transmission module according to another embodiment of the present disclosure.

FIG. 15 is a structural schematic diagram of a signal transmission module according to another embodiment of the present disclosure. In another exemplary embodiment of the present disclosure, for example, for a UHD 120 Hz TV panel, a V BY ONE data signal may include a first sub-data signal D1 and a second sub-data signal D2. The first sub-data signal D1 and the second sub-data signal D2 are high-speed signals. The high-speed signal may include 16 pairs of differential voltage difference signals. In an exemplary embodiment, the first 8 pairs of differential voltage difference signals in the high-speed signal may be allocated to one photoelectric unit, the last 8 pairs of differential signals in the high-speed signal may be allocated to another photoelectric unit, and the low-speed signal may be allocated to a third photoelectric unit. Specifically, the first 8 pairs of differential voltage difference signals in the high-speed signal may be the first sub-data signal VB1, and the last 8 pairs of differential voltage difference signals in the high-speed signal may be the second sub-data signal VB2. The low-speed signal may include the first display control signal, the first communication signal T1 and the second display control signal, and accordingly, the first signal transmission module 12 may include the first photoelectric unit 121, the second photoelectric unit 122 and the third photoelectric unit 123. The first sub-data signal VB1 is allocated to the first photoelectric unit 121, and the electrical signal is converted into an optical signal for transmission. That is, the first photoelectric unit 121 is configured to convert the 8 pairs of high-speed signals (TX0N, TX0P) to (TX7N, TX7P). The second sub-data signal VB2 is allocated to the third photoelectric unit 123, and the electrical signal is converted into an optical signal for transmission. That is, the third photoelectric unit 123 is configured to convert the 8 pairs of high-speed signals (TX8N, TX8P) to (TX15N, TX15P). The first display control signal D1, the first communication signal T1 and the second display control signal D2 are packaged into the second photoelectric unit 122. The second photoelectric unit 122 may include a first channel and a second channel. The second photoelectric unit 122 may transmit the optical signal corresponding to the first display control signal D1 through the first channel, and convert the corresponding optical signal into the first display control signal D1 and output it to the first control circuit 11, and convert the first communication signal T1 and the second display control signal D2 into optical signals for transmission through the second channel. Correspondingly, the second signal transmission module 21 of the display end 2 may include a fourth photoelectric unit 211, a fifth photoelectric unit 212 and a sixth photoelectric unit 213. The fourth photoelectric unit 211 communicates with the first photoelectric unit 121 of the signal source end 1, the fifth photoelectric unit 212 communicates with the second photoelectric unit 122 of the signal source end 1, and the sixth photoelectric unit 213 communicates with the third photoelectric unit 123 of the signal source end 1. The fourth photoelectric unit 211 can convert the optical signal corresponding to the first sub-data signal VB1 into the first sub-data signal VB1. The fifth photoelectric unit 212 includes a first channel and a second channel. The fifth photoelectric unit 212 can convert the first display control signal D1 into an optical signal for transmission through the first channel, and convert the optical signal corresponding to the first communication signal T1 and the optical signal corresponding to the second display control signal D2 into the first communication signal T1 and the second display control signal D2 through the second channel and output them to the second control circuit 22. The sixth photoelectric unit 213 can convert the optical signal corresponding to the second sub-data signal VB2 into the second sub-data signal VB2 and output it to the second control circuit 22. In addition, as described above, one optoelectronic unit may include two 4-channel drive array chips, and the first channel and the second channel in the exemplary embodiment may correspond to a 4-channel drive array chip respectively.

In the exemplary embodiment, the power of the first optoelectronic unit and the power of the third optoelectronic unit may be greater than the power of the second optoelectronic unit, and the power of the fourth optoelectronic unit and the power of the sixth optoelectronic unit may be greater than the power of the fifth optoelectronic unit. That is, a high-power optoelectronic unit is configured to transmit a high-speed signal, and a low-power optoelectronic unit is configured to transmit a low-speed signal.

The structure of the display end 2 of the present disclosure is further described below in conjunction with the accompanying drawings. As shown in FIG. 1, in an exemplary embodiment, the display module may include a backlight unit 23 and a display unit. The display unit may include a second control circuit 22. The backlight unit 23 may include a backlight source and a backlight driving board. The backlight driving board is connected between the second signal transmission module 21 and the backlight source to obtain the first power supply signal V1 to drive the backlight source to emit light. The second control circuit 22 may be a TCON board, the second control circuit 22 is connected to the second signal transmission module 21, and the second control circuit 22 is configured to respond to the V BY ONE data signal for image display. In an exemplary embodiment, the second control circuit 22 can be powered by the third power supply signal V3 output by the first control circuit 11. After the second control circuit 22 obtains the third power supply signal V3, it indicates that the signal source end 1 and the display end 2 have established a connection. The second control circuit 22 can output a feedback signal (first display control signal D1) to the first control circuit 11 to instruct the first control circuit 11 to output the V BY ONE data signal. The V BY ONE data signal output by the first control circuit 11 is output to the second control circuit 22 after being electro-optically converted by the first signal transmission module 12 and photoelectrically converted by the second signal transmission module 21. The second control circuit 22 obtains the V BY ONE data signal for image display. The display module described in the exemplary embodiment can be an LCD module, and its principle of image display is similar to that of the existing LCD module, which will not be expanded here. The second control circuit 22 may include a detection level output terminal, and the second control circuit 22 may also output a detection level signal $V_{CAB\_DET}$ through the detection level output end. The detection level signal $V_{CAB\_DET}$ can be used by the first control circuit 11 to implement hot-plug control of the power line.

As shown in FIG. 1, in an exemplary embodiment, the display end 2 may include a second connector. The second connector may have the same structure as the first connector of the signal source end, and the second connector may be connected to the fourth connector of the transmission part 3. For example, when the display end supplies power to the display unit through its own step-down unit, the second connector may include a 21st pin and a 22nd pin, and the number of pins may be determined according to the number of connected power lines. For example, the second connector may include two 21st pins and one 22nd pin. The fourth connector may include a 41st pin and a 42nd pin. The 21st pin is connected to the 41st pin for transmitting the first power supply signal V1, and the 22nd pin is connected to the 42nd pin for transmitting the detection level signal $V_{CAB\_DET}$. Similar to the principle of hot plugging on the signal source end 1, the pin lengths of the 41st and 42nd pins in the fourth connector can be set to be the same, and the pin length of the 21st pin in the second connector can be set to be greater than the pin length of the 22nd pin. Or, the pin lengths of the 21st and 22nd pins in the second connector can be set to be the same, and the pin length of the 41st pin in the fourth connector can be set to be greater than the pin length of the 42nd pin, so that when the fourth connector of the transmission part 3 is inserted into the second connector, the pin for transmitting the detection level signal $V_{CAB\_DET}$ contacts the fourth connector later than the pin for transmitting the first power supply signal V1, and when the fourth connector is unplugged from the second connector, the pin for transmitting the detection level signal $V_{CAB\_DET}$ separates from the fourth connector before the pin for transmitting the first power supply signal V1, so that the first control circuit can realize the hot plug detection function based on the detection level signal $V_{CAB\_DET}$. The detection principle of hot plugging can be referred to the introduction of the above embodiment, which will not be repeated here.

Alternatively, when the signal source end outputs the first power supply signal V1 to the display end to power the backlight unit of the display end and outputs the third power supply signal V3 to power the display unit, the second connector may include not only the 21st pin and the 22nd pin but also the 23rd pin and the 24th pin, and the number of pins may be determined according to the number of connected power lines. For example, two 23rd pins and two 24th pins may be included, and the fourth connector may also include the 43rd pin and the 44th pin. The 41st pin is connected to the 21st pin, the 42nd pin is connected to the 22nd pin, the 43rd pin is connected to the 23rd pin, and the 23rd pin may be connected to the third pin in the first connector via the power line in the transmission part 3. The 44th pin is connected to the 24th pin, and the 24th pin may be connected to the fourth pin in the first connector via the power line in the transmission part 3. The pin lengths of the 41st, 42nd, 43rd and 44th pins in the fourth connector can be set to be the same, the pin length of the 23rd pin in the second connector can be set to be the same as the pin length of the 24th pin, and the pin lengths of the 21st, 23rd and 22nd pins can be set to decrease in sequence. Or, the pin lengths of the 21st, 22nd, 23rd and 24th pins in the second connector can be set to be the same, the pin length of the 43rd pin in the fourth connector can be set to be the same as the pin length of the 44th pin, and the pin lengths of the 41st, 43rd and 42nd pins can be set to decrease in sequence. In this way, the first control circuit can also realize the hot plug detection function on the display end 2 based on the detection level signal $V_{CAB\_DET}$.

In an exemplary embodiment of the present disclosure, for example, for a UHD 60 Hz TV panel, the second connector may further include the aforementioned 23rd to 26th pins. The third power supply signal V3 is transmitted through the 23rd pin. The fourth power supply signal V4 is transmitted through the 24th pin. The optical signal corresponding to the first sub-data signal VB1 is transmitted by connecting the 25th pin to the optical fiber in the transmission part 3. The first display control signal D1 is transmitted by connecting the 26th pin to the optical fiber in the transmission part 3.

As shown in FIG. 15, in another exemplary embodiment of the present disclosure, for example, for a UHD 120 Hz TV panel, the second connector may include the 21st to 28th pins, wherein the 21st to 26th pins have the same function as the pins in the above embodiment, and the 27th pin may be connected to the 7th pin in the first connector through the optical fiber in the transmission part 3 for transmitting the last 8 pairs of differential signals. The 28th pin may be connected to the 8th pin in the first connector through the optical fiber in the transmission part 3 for transmitting the optical signal corresponding to the second display control signal D2 and the optical signal corresponding to the first communication signal T1.

In an exemplary embodiment of the present disclosure, for example, for a UHD 60 Hz TV panel, the display end 2 may include two photoelectric converters, which are a fourth photoelectric unit 211 and a fifth photoelectric unit 212. The fourth photoelectric unit 211 communicates with the first photoelectric unit 121 of the signal source end 1 to transmit a high-speed signal for converting an optical signal corresponding to the first sub-data signal VB1 into the first sub-data signal VB1. The fifth photoelectric unit 212 communicates with the second photoelectric unit of the signal source end 1 to transmit a low-speed signal for converting the first display control signal D1 into an optical signal for transmission and converting the optical signal corresponding to the first communication signal T1 and outputting it.

In another exemplary embodiment of the present disclosure, for example, for a UHD 120 Hz TV panel, the display end 2 may include a fourth photoelectric unit 211, a fifth photoelectric unit 212, and a sixth photoelectric unit 213. The fourth photoelectric unit 211 communicates with the first photoelectric unit 121 of the signal source end 1, transmits the first 8 pairs of high-speed signals, and is configured to convert the optical signal corresponding to the first sub-data signal VB1 into the first sub-data signal VB1. The fifth photoelectric unit 212 communicates with the second photoelectric unit of the signal source end 1, and transmits the low-speed signal. The fifth photoelectric unit 212 includes a first channel and a second channel. The first channel is configured to convert the first display control signal D1 into an optical signal for transmission, and the second channel is configured to convert the optical signals corresponding to the second display control signal D2 and the first communication signal T1 into the second display control signal D2 and the first communication signal T1 and output them to the second control circuit 22. The sixth photoelectric unit 213 is configured to convert the optical signal corresponding to the second sub-data signal VB2 into the second sub-data signal VB2.

In addition, as shown in FIG. 3, in an exemplary embodiment, the display end 2 may also include a step-down unit 24, which is connected between the power output end of the backlight driving board and the power input end of the second control circuit 22. The step-down unit 24 is configured to output a third power supply signal V3 according to the output voltage of the backlight driving board, and the third power supply signal V3 is configured to power the second control circuit 22. By setting the step-down unit 24 on the display end 2, it is not necessary to output the third power supply signal V3 through the signal source end 1, thereby avoiding the problem of poor display caused by insufficient power supply to the screen due to line voltage drop loss.

The step-down unit 24 of the display end 2 may also have a structure as shown in FIG. 4. That is, the step-down unit 24 may be connected between the power input end of the display unit and the second signal transmission module 21. The step-down unit 24 directly steps down the received first power supply signal V1 and outputs a fifth power supply signal to power the display unit. It should be understood that the fifth power supply signal output by the step-down unit 24 shown in FIG. 4 may have the same voltage characteristics as the fifth power supply signal output by the step-down unit 24 shown in FIG. 3.

In addition, in an exemplary embodiment, the second control circuit 22 can be configured to output the first display control signal D1 when obtaining the third power supply signal V3. The second signal transmission module 21 converts the first display control signal D1 into an optical signal for transmission. The first signal transmission module 12 converts the optical signal into the first display control signal D1 and outputs it to the first control circuit 11 to instruct the first control circuit 11 to output the V BY ONE data signal. In other words, after the second control circuit 22 located at the display end 2 obtains the third power supply signal V3, it indicates that the first signal transmission module 12 of the signal source end 1 and the second signal transmission module 21 of the display end 2 have established a connection, and the second control circuit 22 outputs the first display control signal D1 to the first control circuit 11 to instruct the first control circuit 11 to output the V BY ONE data signal.

Figure 16:
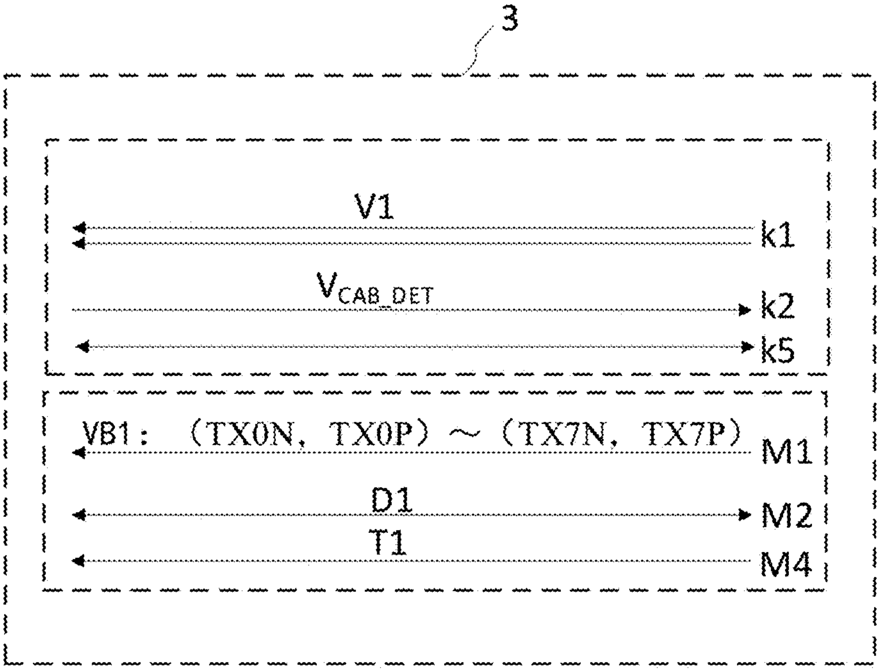
FIG. 16 is a structural schematic diagram of a transmission part according to an embodiment of the present disclosure.

In an exemplary embodiment, the optical fiber in the transmission part 3 can include a plurality of sub-optical fibers, and the number of sub-optical fibers can correspond to the number of photoelectric converters of the signal source end 1 and the display end 2. FIG. 16 is a structural schematic diagram of a transmission part according to an embodiment of the present disclosure. As shown in FIG. 16, in an exemplary embodiment of the present disclosure, for example, for a UHD 60 Hz TV panel, the optical fiber may include a first sub-optical fiber M1, a second sub-optical fiber M2, and a fourth sub-optical fiber M4. For example, it may include a plurality of first sub-optical fibers M1, a plurality of second sub-optical fibers M2, and a plurality of fourth sub-optical fibers M4. The first sub-optical fiber M1 is configured to transmit a first sub-data signal VB1, which is a high-speed signal and may include 8 pairs of differential voltage difference signals. The second sub-optical fiber M2 is used for a first display control signal D1, and the fourth sub-optical fiber M4 is configured to transmit a first communication signal T1. The first display control signal D1 is a low-speed signal and is configured to instruct the first control circuit 11 to output the first sub-data signal VB1.

Figure 17:
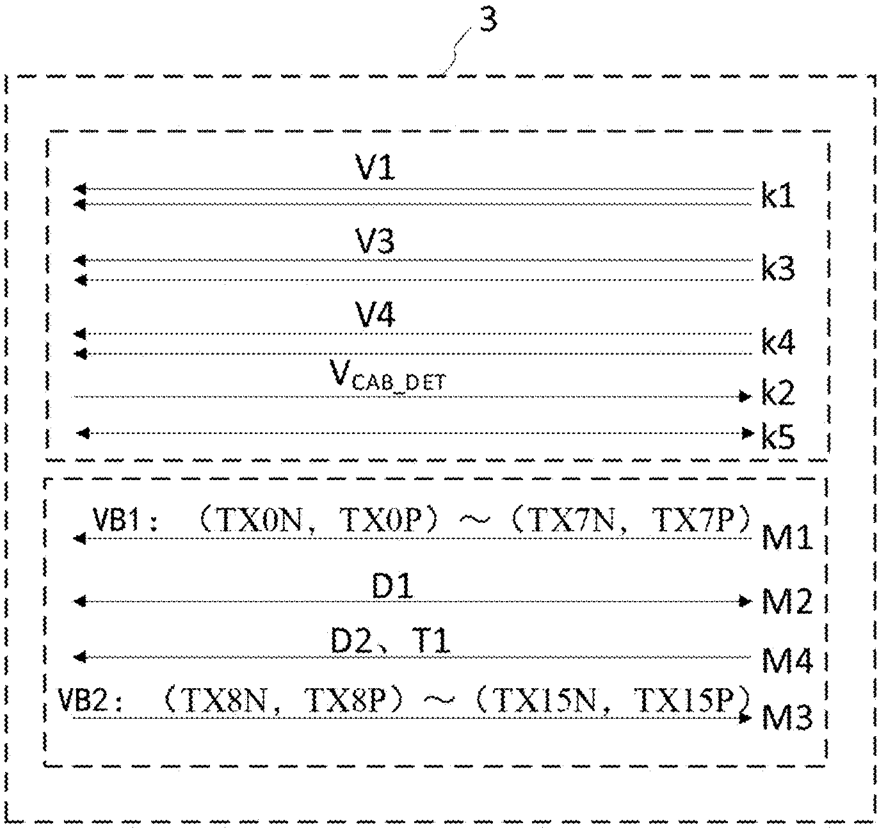
FIG. 17 is a structural schematic diagram of a transmission part according to another embodiment of the present disclosure.

FIG. 17 is a structural schematic diagram of a transmission part 3 according to another embodiment of the present disclosure. As shown in FIG. 17, in another exemplary embodiment of the present disclosure, for example, for UHD 120 Hz TV panel, the optical fiber may include a first sub-optical fiber M1, a second sub-optical fiber M2, a third sub-optical fiber M3 and a fourth sub-optical fiber M4. For example, it may include multiple first sub-optical fibers M1, multiple second sub-optical fibers M2, multiple third sub-optical fibers M3 and multiple fourth sub-optical fibers M4. The first sub-optical fiber M1 and the third sub-optical fiber M3 may be configured to transmit high-speed signals, and the second sub-optical fiber M2 and the fourth sub-optical fiber M4 may be configured to transmit low-speed signals. Specifically, the first sub-optical fiber M1 may be configured to transmit the first sub-data signal VB1, the first sub-data signal VB1 may include the first 8 pairs of differential voltage difference signals in the high-speed signal. The second sub-optical fiber M2 may be configured to transmit the first display control signal D1 in the low-speed signal. The first display control signal D1 is configured to instruct the first control circuit 11 to output the first sub-data signal VB1. The third sub-optical fiber M3 may be configured to transmit the second sub-data signal VB2, the second sub-data signal VB2 may include the last 8 pairs of differential voltage difference signals in the high-speed signal. The fourth sub-optical fiber M4 may be configured to transmit the second display control signal D2 and the first communication signal T1 in the low-speed signal, and the second display control signal D2 is configured to adjust the backlight parameters of the display module.

As shown in FIG. 16, in an exemplary embodiment of the present disclosure, for example, in a case where the signal source end provides a backlight power supply signal to the display end and the step-down unit of the display end provides a display power supply signal, the transmission part 3 may also include multiple power lines, and the multiple power lines may include, for example: a pair of first power lines K1, a second power line K2, and a standby power line K5. The first power line may be configured to transmit the first power supply signal V1, and the second power line K2 may be configured to transmit the detection level signal. It should be understood that the number of power lines is not limited to this and is set according to specific circumstances.

As shown in FIG. 17, in another exemplary embodiment of the present disclosure, for example, in a case where the signal source end provides a backlight power supply signal and a display power supply signal to the display end, the multiple power lines in the transmission part 3 may include a first power line K1, a second power line K2, a third power line K3, a fourth power line K4, and a standby power line K5, for example, a pair of first power lines K1, a second power line K2, a pair of third power lines K3, a pair of fourth power lines K4, and a standby power line K5. Among them, the first power line K1 can be configured to transmit the first power supply signal V1, the third power line K3 can be configured to transmit the third power supply signal V3, the third power supply signal V3 is configured to power the second control circuit 22, the fourth power line K4 can be configured to transmit the fourth power supply signal V4. The fourth power supply signal V4 can be configured to power the first signal transmission module 12 and the second signal transmission module 21. The second power line K2 can be configured to transmit the detection level signal $V_{CAB\_DET}$, where the detection level signal $V_{CAB\_DET}$ is configured to instruct the first control circuit 11 to output the first power supply signal V1, the third power supply signal V3 and the fourth power supply signal V4 for output control. The first control circuit 11 outputs a voltage control signal to control the corresponding switch unit in the switch module to turn on or off. It should be understood that FIGS. 16 and 17 are only exemplary illustrations, and cannot be understood as a corresponding relationship between the number of sub-optical fibers and the power lines. The number of power lines depends on whether the display unit of the display end is powered by the signal source end or the display end.

On this basis, in an exemplary embodiment, the transmission part 3 may include a third connector and a fourth connector. The third connector is configured to connect to the first connector of the signal source end, and the fourth connector is configured to connect to the second connector of the display end. The third connector and the fourth connector may have the same structure and pin features, so the third connector may also be connected to the second connector, and the fourth connector may also be connected to the first connector. These all belong to the protection scope of the present disclosure. The present disclosure is only exemplified by the third connector being connected to the first connector and the fourth connector being connected to the second connector.

In an exemplary embodiment, in a case where the signal source end only outputs the first power supply signal V1 to the display end to power the backlight unit of the display end, the third connector may include a thirty-first pin and a thirty-second pin, and the fourth connector may include a forty-first pin and a forty-second pin. The thirty-first pin is configured to connect the first pin, the thirty-second pin is configured to connect the forty-second pin, the forty-first pin is configured to connect the twenty-first pin, and the forty-second pin is configured to connect the twenty-second pin. The first pin, the twenty-first pin, the thirty-first pin, and the forty-first pin are configured to transmit the first power supply signal V1, and the second pin, the twenty-second pin, the thirty-second pin, and the forty-second pin are configured to transmit the detection level signal $V_{CAB\_DET}$. In order to realize the hot plug detection function, the pin length of the thirty-first pin and the pin length of the thirty-second pin can be set to be different. For example, the pin lengths of the first pin and the second pin in the first connector can be set to be the same, the pin length of the thirty-first pin in the third connector can be set to be greater than the pin length of the thirty-second pin, and the pin length of the twenty-first pin in the second connector can be set to be the same as the pin length of the twenty-second pin, and the pin length of the forty-first pin in the fourth connector can be set to be greater than the pin length of the forty-second pin. Thus, during the process of the third connector being inserted into the first connector or the fourth connector being inserted into the second connector, the pin for transmitting the detection level signal $V_{CAB\_DET}$ in the transmission part 3 contacts the first connector or the second connector later than the pin for transmitting the first power supply signal V1, and during the process of the third connector being unplugged from the first connector or the fourth connector being unplugged from the second connector, the pin for transmitting the detection level signal $V_{CAB\_DET}$ in the transmission part 3 separates from the first connector or the second connector earlier than the pin for transmitting the first power supply signal V1, so that the first control circuit can realize the hot plug detection function based on the detection level signal $V_{CAB\_DET}$. In addition, the third connector may further include the 33rd to 36th pins, and the fourth connector may further include the 43rd to 46th pins. The 33rd to 36th pins are connected to the 3rd to 6th pins in the first connector, and the 43rd to 46th pins are connected to the 23rd to 26th pins in the second connector. The transmission part of this structure can be applied to UHD 60 Hz TV panels.

In an exemplary embodiment, when the signal source end outputs the first power supply signal V1, the third power supply signal V3 and the fourth power supply signal V4 to the display end, the third connector may include the 31st to 34th pins, and the fourth connector may include the 41st to 44th pins. The 31st pin is configured to connect the first pin in the first connector, the 32nd pin is configured to connect the second pin in the first connector, the 33rd pin is configured to connect the third pin in the first connector, and the 34th pin is configured to connect the fourth pin in the first connector; the 41st pin is configured to connect the 21st pin in the second connector, the 42nd pin is configured to connect the 22nd pin in the second connector, the 43rd pin is configured to connect the 23rd pin in the second connector, and the 44th pin is configured to connect the 24th pin in the second connector. The 31st and 41st pins are configured to transmit the first power supply signal V1, the 32nd and 42nd pins are configured to transmit the detection level signal $V_{CAB\_DET}$, the 33rd and 43rd pins are configured to transmit the third power supply signal V3, and the 34th and 44th pins are configured to transmit the fourth power supply signal V4. Similarly, the pin lengths of the first pin, the second pin, the third pin, and the fourth pin in the first connector can be set to be the same, the pin length of the thirty-third pin in the third connector can be set to be the same as the pin length of the thirty-fourth pin, and the pin lengths of the thirty-first pin, the thirty-third pin, and the thirty-second pin decrease in sequence, and the pin lengths of the twenty-first pin, the twenty-second pin, the twenty-third pin, and the twenty-fourth pin in the second connector can be set to be the same, and the pin length of the forty-third pin in the fourth connector can be set to be the same as the pin length of the forty-fourth pin, and the pin lengths of the forty-first pin, the forty-third pin, and the forty-second pin decrease in sequence. In this way, when the pin lengths for transmitting power supply signals in the first connector and/or the second connector are the same, the first control circuit can also implement the hot plug detection function based on the detection level signal $V_{CAB\_DET}$.

On the basis of the above embodiment, the third connector may further include the 33rd to 36th pins, and the fourth connector may further include the 43rd to 46th pins. The 33rd to 36th pins are connected to the 3rd to 6th pins in the first connector, and the 43rd to 46th pins are connected to the 23rd to 26th pins in the second connector. The transmission part of this structure can be applied to UHD 60 Hz TV panels. Alternatively, the third connector may further include the 33rd to 38th pins, and the fourth connector may further include the 43rd to 48th pins, the 33rd to 38th pins are connected to the 3rd to 8th pins in the first connector, and the 43rd to 48th pins are connected to the 23rd to 28th pins in the second connector. The transmission part of this structure can be applied to UHD 120 Hz TV panels. The purpose, definition of each pin and number of pins can be found in the introduction of the above embodiment, and will not be described in detail here.

Compared with the traditional use of electronic cables to transmit low-speed signals, which requires more than a dozen electronic cables, and the loss will be very large when the cable length increases, the transmission part 3 of this exemplary embodiment uses optical fiber to transmit V BY ONE data signals. There will be no loss problem when transmitting through optical fiber, and as the cable length increases, the cost of optical fiber transmission will be more advantageous.

After considering the specification and practicing the present disclosure herein, those skilled in the art will easily think of other embodiments of the present disclosure. This application is intended to cover any variation, use or adaptive change of the present disclosure, which follows the general principles of the present disclosure and includes common knowledge or customary technical means in the technical field that are not disclosed in the present disclosure. The specification and examples are only to be regarded as exemplary, and the true scope and spirit of the present disclosure are indicated by the attached claims.

What is claimed is:

1. A display device, comprising a signal source end, a display end and a transmission part, wherein the signal source end is separately arranged from the display end and the signal source end and the display end are connected through the transmission part; wherein, the signal source end comprises:

a first control circuit for outputting a V BY ONE data signal; and a first photoelectric converter connected to the first control circuit, wherein the first photoelectric converter is configured to obtain the V BY ONE data signal and convert the V BY ONE data signal into an optical signal for transmission;

wherein the transmission part comprises an optical fiber; and wherein the display end comprises:

a second photoelectric converter connected to the first photoelectric converter through the optical fiber, wherein the second photoelectric converter is configured to convert the received optical signal into a corresponding V BY ONE data signal; and a display module connected to the second photoelectric converter, wherein the display module is configured to obtain the V BY ONE data signal for image display, wherein the signal source end further comprises:

a first power source module;

the transmission part further comprises a power line;

the first power source module is configured to supply power to the display module through the power line, wherein, the first control circuit further comprises a detection level input terminal, and the first control circuit is configured to receive a detection level signal through the detection level input terminal;

the display module further comprises a detection level output terminal, and the display module is configured to output the detection level signal through the detection level output terminal;

the power line further comprises a second power line, and the second power line is configured to transmit the detection level signal;

wherein, the detection level signal is configured to control an output of the first voltage output terminal, and/or, to control an output of the third voltage output terminal, and/or an output of the fourth voltage output terminal, the signal source end further comprises a first connector, the display end further comprises a second connector, and the transmission part comprises a third connector and a fourth connector, the third connector is configured to connect the first connector, and the fourth connector is configured to connect the second connector, the first connector comprises a first pin and a second pin;

the second connector comprises a twenty-first pin and a twenty-second pin;

the third connector comprises a thirty-first pin and a thirty-second pin, and the fourth connector comprises a forty-first pin and a forty-second pin, the thirty-first pin is configured to connect the first pin, the thirty-second pin is configured to connect the second pin, the forty-first pin is configured to connect the twenty-first pin, and the forty-second pin is configured to connect the twenty-second pin;

wherein, the first pin, the twenty-first pin, the thirty-first pin, and the forty-first pin are configured to transmit a first power supply signal for supplying power to a backlight unit comprised in the display module, and the second pin, the twenty-second pin, the thirty-second pin, and the forty-second pin are configured to transmit the detection level signal;

a pin length of the first pin is greater than a pin length of the second pin or a pin length of the thirty-first pin is greater than a pin length of the thirty-second pin, and a pin length of the twenty-first pin is greater than a pin length of the twenty-second pin or a pin length of the forty-first pin is greater than a pin length of the forty-second pin.

2. The display device according to claim 1, wherein, the first power source module comprises a first voltage output terminal;

the power line comprises a first power line;

the first power source module is configured to output the first power supply signal through the first voltage output terminal, and transmit the first power supply signal through the first power line to supply power to the backlight unit.

3. The display device according to claim 2, wherein the display module further comprises:

a display unit;

a step-down unit connected between a power output terminal of the backlight unit and a power input terminal of the display unit, wherein the step-down unit is configured to output a fifth power supply signal according to an output voltage of the backlight unit to supply power to the display unit.

4. The display device according to claim 2, wherein the display module further comprises:

a display unit;

a step-down unit connected between a power input terminal of the display unit and the second photoelectric converter, wherein the step-down unit is configured to receive the first power supply signal and output a fifth power supply signal according to the first power supply signal to power the display unit.

5. The display device according to claim 2, wherein the display module further comprises a display unit, and the first power source module is connected to the first control circuit;

the first control circuit comprises a third voltage output terminal;

the power line further comprises a third power line;

the first power source module is configured to output a third power supply signal through the third voltage output terminal, and transmit the third power supply signal through the third power line, and the third power supply signal is configured to power the display unit, wherein a voltage value of the third power supply signal is less than a voltage value of the first power supply signal;

and/or, the first control circuit comprises a fourth voltage output terminal;

the power line further comprises a fourth power line;

the first power source module is configured to output a fourth power supply signal through the fourth voltage output terminal, and transmit the fourth power supply signal through the fourth power line, and the fourth power supply signal is configured to power the second photoelectric converter, wherein a voltage value of the fourth power supply signal is less than a voltage value of the first power supply signal.

6. The display device according to claim 1, wherein the first connector further comprises a third pin and a fourth pin;

the second connector further comprises a twenty-third pin and a twenty-fourth pin;

the third connector further comprises a thirty-third pin and a thirty-fourth pin, the thirty-third pin is configured to connect the third pin, and the thirty-fourth pin is configured to connect the fourth pin;

the fourth connector further comprises a forty-third pin and a forty-fourth pin, the forty-third pin is configured to connect the twenty-third pin, and the forty-fourth pin is configured to connect the twenty-fourth pin;

wherein, the third pin, the twenty-third pin, the thirty-third pin, and the forty-third pin are configured to transmit a third power supply signal configured to power the display unit, and the fourth pin, the twenty-fourth pin, the thirty-fourth pin, and the forty-fourth pin are configured to transmit a fourth power supply signal configured to power the second photoelectric converter;

a pin length of the third pin is the same as a pin length of the fourth pin, and pin lengths of the first pin, the third pin, and the second pin decrease in sequence, or a pin length of the thirty-third pin is the same as a pin length of the thirty-fourth pin, and pin lengths of the thirty-first pin, the thirty-third pin, and the thirty-second pin decrease in sequence; and a pin length of the twenty-third pin is the same as a pin length of the twenty-fourth pin, and pin lengths of the twenty-first pin, the twenty-third pin, and the twenty-second pin decrease in sequence, or a pin length of the forty-third pin is the same as a pin length of the forty-fourth pin, and pin lengths of the forty-first pin, the forty-third pin, and the forty-second pin decrease in sequence.

7. The display device according to claim 1, wherein the V BY ONE data signal comprises a first sub-data signal; the display module further comprises a second control circuit, the second control circuit is configured to output a first display control signal through the second photoelectric converter, and the first control circuit is configured to obtain the first display control signal through the first photoelectric converter;

the first connector further comprises a fifth pin and a sixth pin;

the second connector further comprises a twenty-fifth pin and a twenty-sixth pin;

the third connector further comprises a thirty-fifth pin and a thirty-sixth pin, the thirty-fifth pin is configured to connect the fifth pin, and the thirty-sixth pin is configured to connect the sixth pin;

the fourth connector further comprises a forty-fifth pin and a forty-sixth pin, the forty-fifth pin is configured to connect the twenty-fifth pin, and the forty-sixth pin is configured to connect the twenty-sixth pin;

wherein, the fifth pin, the twenty-fifth pin, the thirty-fifth pin, and the forty-fifth pin are configured to transmit the first sub-data signal;

the sixth pin, the twenty-sixth pin, the thirty-sixth pin, and the forty-sixth pin are configured to transmit the first display control signal, and the first display control signal is configured to instruct the first control circuit to output the first sub-data signal.

8. The display device according to claim 7, wherein the display unit comprises the second control circuit;

the first control circuit is further configured to output a first communication signal to communicate with the second control circuit to adjust a first display parameter of the display unit;

the first connector further comprises an eighth pin;

the second connector further comprises a twenty-eighth pin;

the third connector further comprises a thirty-eighth pin, and the thirty-eighth pin is configured to connect the eighth pin;

the fourth connector further comprises a forty-eighth pin, and the forty-eighth pin is configured to connect the twenty-eighth pin;

the eighth pin, the twenty-eighth pin, the thirty-eighth pin, and the forty-eighth pin are configured to transmit the first communication signal.

9. The display device according to claim 1, wherein the display module further comprises a second control circuit;

the first control circuit is configured to output a second display control signal through the first photoelectric converter, and the second control circuit is configured to obtain the second display control signal through the second photoelectric converter;

the first connector further comprises an eighth pin;

the second connector further comprises a twenty-eighth pin;

the third connector further comprises a thirty-eighth pin, and the thirty-eighth pin is configured to connect the eighth pin;

the fourth connector further comprises a forty-eighth pin, and the forty-eighth pin is configured to connect the twenty-eighth pin;

the eighth pin, the twenty-eighth pin, the thirty-eighth pin, and the forty-eighth pin are configured to transmit the second display control signal, and the second display control signal is configured for the first control circuit to communicate with the second control circuit and/or the backlight unit to adjust a preset parameter in the second control circuit and/or the backlight unit.

10. The display device according to claim 1, wherein the V BY ONE data signal further comprises a second sub-data signal;

the first connector further comprises a seventh pin;

the second connector further comprises a twenty-seventh pin;

the third connector further comprises a thirty-seventh pin, and the thirty-seventh pin is configured to connect the seventh pin;

the fourth connector further comprises a forty-seventh pin, and the forty-seventh pin is configured to connect the twenty-seventh pin;

wherein, the seventh pin, the twenty-seventh pin, the thirty-seventh pin, and the forty-seventh pin are configured to transmit the second sub-data signal.

11. The display device according to claim 1, wherein the display module further comprises a second control circuit;

the second control circuit is configured to output a first display control signal, the first display control signal is configured to instruct the first control circuit to output the V BY ONE data signal;

the second photoelectric converter is further configured to obtain the first display control signal and convert the first display control signal into an optical signal for transmission;

the first photoelectric converter is further configured to receive an optical signal corresponding to the first display control signal and convert the optical signal corresponding to the first display control signal into an electrical signal for output;

and/or, the first control circuit is further configured to output a second display control signal, the second display control signal is configured for the first control circuit to communicate with the second control circuit and/or the backlight unit to adjust a preset parameter in the second control circuit and/or the backlight unit;

the first photoelectric converter is further configured to obtain the second display control signal and convert the second display control signal into an optical signal for transmission;

the second photoelectric converter is further configured to receive an optical signal corresponding to the second display control signal and convert the optical signal corresponding to the second display control signal into an electrical signal for output.

12. The display device according to claim 11, wherein the V BY ONE data signal comprises a first sub-data signal;

the first photoelectric converter comprises:

a first photoelectric unit, configured to convert the first sub-data signal into an optical signal for transmission;

a second photoelectric unit, comprising a first channel, wherein the second photoelectric unit is configured to receive an optical signal corresponding to the first display control signal through the first channel, and convert corresponding optical signal into the first display control signal;

the second photoelectric converter comprises:

a fourth photoelectric unit, configured to convert an optical signal corresponding to the first sub-data signal into the first sub-data signal;

a fifth photoelectric unit, comprising a first channel, wherein the fifth photoelectric unit is configured to convert the first display control signal into an optical signal for transmission through the first channel;

the transmission part comprises:

a first sub-optical fiber, configured to transmit the optical signal corresponding to the first sub-data signal;

a second sub-optical fiber, configured to transmit the first display control signal;

wherein, a power of the first photoelectric unit is greater than a power of the second photoelectric unit, and a power of the fourth photoelectric unit is greater than a power of the fifth photoelectric unit.

13. The display device according to claim 12, wherein the display unit comprises the second control circuit;

the first control circuit is further configured to output a first communication signal to communicate with the second control circuit to adjust a first display parameter of the display unit;

the second photoelectric unit further comprises a second channel, and the second photoelectric unit is further configured to convert the second display control signal and the first communication signal into an optical signal for transmission through the second channel;

the fifth photoelectric unit further comprises a second channel, and the fifth photoelectric unit is configured to convert the optical signal corresponding to the second display control signal and the optical signal corresponding to the first communication signal into the second display control signal for output through the second channel;

the transmission part further comprises:

a fourth sub-optical fiber for transmitting the optical signal corresponding to the second display control signal and the optical signal corresponding to the first communication signal.

14. The display device according to claim 13, wherein the V BY ONE data signal further comprises a second sub-data signal;

the first photoelectric converter further comprises:

a third photoelectric unit configured to convert the second sub-data signal into an optical signal for transmission;

the second photoelectric converter further comprises:

a sixth photoelectric unit configured to convert the optical signal corresponding to the second sub-data signal into the second sub-data signal;

the transmission part further comprises:

a third sub-optical fiber for transmitting the optical signal corresponding to the second sub-data signal;

wherein, a power of the third photoelectric unit is greater than a power of the second photoelectric unit, and a power of the sixth photoelectric unit is greater than a power of the fifth photoelectric unit.

15. The display device according to claim 1, wherein the signal source end further comprises:

a switch control circuit, wherein the switch control circuit controls an output of the first voltage output terminal, and/or controls an output of the third voltage output terminal, and/or controls an output of the fourth voltage output terminal in response to a signal of the first control circuit.

16. The display device according to claim 15, wherein the switch control circuit comprises:

a first switch module, comprising a first switch unit, a second switch unit and a third switch unit, wherein a control terminal of the first switch unit is connected to the detection level signal, a first terminal of the first switch unit is connected to the first power supply signal through a voltage divider circuit, and a second terminal of the first switch unit is grounded; a control terminal of the second switch unit is connected to the first terminal of the first switch unit, a first terminal of the second switch unit is connected to the first power supply signal through another voltage divider circuit, and a second terminal of the second switch unit is grounded; a control terminal of the third switch unit is connected to the first terminal of the second switch unit, a first terminal of the third switch unit is connected to the first power supply signal, and the second terminal of the third switch unit is connected to the first voltage output terminal;

a first power control terminal connected to the first terminal of the second switch unit;

the first control circuit is configured to control an output of the first voltage output terminal based on the detection level signal, or to control an output of the first voltage output terminal by outputting a first power supply control signal through the first power control terminal.

* * * * *